US012732763B2

(12) United States Patent
Bader et al.

(10) Patent No.: US 12,732,763 B2
(45) Date of Patent: Sep. 8, 2026

(54) HEARING COMPENSATION IN AN AUDIO DEVICE

(71) Applicant: Aviom, Inc., West Chester, PA (US)

(72) Inventors: Carl V. Bader, Downingtown, PA (US); Brian Chapkovich, Coatesville, PA (US); Frank Wartinger, Broomall, PA (US)

(73) Assignee: Aviom, Inc., West Chester, PA (US)

( * ) Notice: Subject to any disclaimer, the term of this patent is extended or adjusted under 35 U.S.C. 154(b) by 0 days.

(21) Appl. No.: 19/563,626

(22) Filed: Mar. 11, 2026

(65) Prior Publication Data

US 2026/0205749 A1 Jul. 16, 2026

Related U.S. Application Data

(63) Continuation of application No. PCT/US2025/046206, filed on Sep. 12, 2025.

(60) Provisional application No. 63/821,247, filed on Jun. 10, 2025, provisional application No. 63/701,940, filed on Oct. 1, 2024.

(51) Int. Cl.
*H04R 25/00* (2006.01)
*H04R 3/04* (2006.01)

(52) U.S. Cl.
CPC ............... *H04R 25/70* (2013.01); *H04R 3/04* (2013.01)

(58) Field of Classification Search
None
See application file for complete search history.

(56) References Cited

U.S. PATENT DOCUMENTS

| | | | |
|---|---|---|---|
| 7,756,281 | B2 | 7/2010 | Goldstein et al. |
| 9,014,379 | B2 | 4/2015 | Rank et al. |
| 9,313,583 | B2 | 4/2016 | Reiger et al. |
| 9,577,596 | B2 | 2/2017 | Ray et al. |
| 9,712,934 | B2 | 7/2017 | Moore et al. |
| 9,748,914 | B2 | 8/2017 | Antonellis et al. |
| 10,602,275 | B2 | 3/2020 | Hui et al. |

(Continued)

FOREIGN PATENT DOCUMENTS

| | | | |
|---|---|---|---|
| KR | 10-2376227 | B1 | 3/2022 |
| WO | 2012/066149 | A1 | 5/2012 |

OTHER PUBLICATIONS

Corey, “Microphone Array Processing for Augmented Listening”, Illinois library at University of Illinois at Urbana-Champaign, Dec. 31, 2019, retrieved on [Oct. 4, 2025]. Retrieved from the internet <URL: https://www.ideals.illinois.edu/items/ 113766, 48 pages.

(Continued)

*Primary Examiner* — Walter F Briney, III
(74) *Attorney, Agent, or Firm* — BakerHostetler

(57) ABSTRACT

Compensation for the hearing loss of a user may be provided in an audio device, based on the hearing information of a user input to the audio device, by applying one or more different forms of hearing loss compensation to an audio signal output via the audio device, while also enabling a user to control the degree to which the one or more different forms of hearing loss compensation are applied to the audio signal output via the audio device. A user may be presented with a selection of such hearing compensation controls based on which of a plurality of common hearing profiles the user's hearing information most closely matches.

20 Claims, 20 Drawing Sheets

(56) References Cited

U.S. PATENT DOCUMENTS

| | | | | |
|---|---|---|---|---|
| 2010/0234757 | A1* | 9/2010 | Stromsted .............. | H04R 25/70 600/559 |
| 2011/0051942 | A1 | 3/2011 | Wilson | |
| 2011/0142272 | A1* | 6/2011 | Takagi .................. | H04R 25/70 381/321 |
| 2011/0158427 | A1 | 6/2011 | Chiba et al. | |
| 2015/0049876 | A1 | 2/2015 | Kim et al. | |
| 2015/0281853 | A1 | 10/2015 | Eisner et al. | |
| 2025/0317697 | A1 | 10/2025 | Starobin | |

OTHER PUBLICATIONS

International Search Report and Written Opinion, PCT application PCT/US2025/046206, dated Oct. 10, 2025, 10 pages.

U.S. Appl. No. 19/563,571, Notice of Allowance dated May 27, 2026, 10 pages.

* cited by examiner

HEARING COMPENSATION IN AN AUDIO DEVICE

CROSS-REFERENCE TO RELATED APPLICATIONS

This application is a continuation of Patent Cooperation Treaty (PCT) application PCT/US25/46206, filed Sep. 12, 2025, titled "Hearing Compensation in an Audio Device," which claims priority to, and claims the benefit of the filing dates of, U.S. Provisional Application No. 63/701,940, filed Oct. 1, 2024, titled "Hearing Profile Compensation in an Audio Device" and U.S. Provisional Application No. 63/821,247, filed Jun. 10, 2025, titled "Hearing Compensation in an Audio Device," the contents of which are incorporated herein by reference in their entireties.

BACKGROUND

Hearing loss is a common problem among humans. An audiogram (sometimes also referred to herein simply as "hearing information") is the typical output of a hearing test, indicating the extent to which the test subject is exhibiting hearing loss at different frequencies. It is common for people to have both overall loss, which is common to both ears, and spatial (i.e., differential) loss where the ears have different losses at different frequencies. Spatial loss may cause stereo and positional two-dimensional (2D) and three-dimensional (3D) information to be skewed in its spatial presentation, potentially causing positional movement artifacts. Some users may experience some overall loss in both ears but not experience a difference in losses between ears (i.e., no differential loss). Such a hearing profile may be referred to as symmetrical hearing loss. A user that experiences a difference in loss between the left and right ears (without or without some symmetrical loss as well) may be said to exhibit an asymmetrical hearing profile. Other possible hearing profiles include a normal profile (hearing within normal ranges), mid-range dip (significant loss in mid-range frequencies, but less loss at higher frequencies) (sometimes also referred to as a notch profile), and profound unilateral (only one ear provides usable hearing). A user may benefit from an audio device that provides various forms of control of hearing compensation depending upon the user's hearing profile, as indicated by the user's hearing information (e.g., audiogram data) obtained from a hearing test.

SUMMARY

Disclosed herein are methods, apparatus, and systems for providing user control of different types of hearing loss compensation for different types of hearing loss (i.e., different hearing profiles). A user may be presented with a selection of hearing compensation controls based on which of a plurality of common (i.e., known or recognizable) hearing profiles the user's hearing information most closely matches. The hearing information may indicate, for each of the left and right ears of the user, an amount of hearing loss exhibited by the user at each of a plurality of frequencies.

Based on the hearing information, as one form of hearing loss compensation, the audio device may determine at least a first filter configured to compensate for an overall hearing loss, common to both the left and right ears, as indicated by the hearing information. The audio device may also determine, based on the hearing information, at least a second filter configured to compensate for a difference in hearing loss, between the left and right ears, as indicated by the hearing information. The at least the first filter and the at least the second filter may be applied to an original audio signal to generate a filtered audio signal. The filtered audio signal may be output to the user. The audio device may enable a user to provide user input indicative of a change in a strength of each of the at least the first filter and the at least the second filter applied to the original audio signal to generate the filtered audio signal. The filtered audio signal may be adjusted based on the user input. Other controls may be made available to the user to enable the user to control the degree to which other forms of hearing compensation may be applied to the original audio signal, including dynamics control, secondary EQ control, EQ tilt control, dead region ducking, and contralateral routing of signal (CROS) control.

The user may provide the user input to control the different forms of hearing loss compensation in real-time, while the user is listening to the filtered audio signal. Such real-time control enables the user to "dial-in" the strength of the applied filters and other forms of hearing compensation to produce the best perceived listening experience for the user. The methods, apparatus, and systems described herein may be used to enhance the individual listening experience in professional, prosumer, and consumer listening environments and may be used when listening with headphones, in-ear-monitors (IEMs), or speakers. The methods, apparatus, and system described herein may be implemented in hardware and/or software, including digital signal processor (DSP) audio plugins and audio plugins running on personal computers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION

Figure 1:
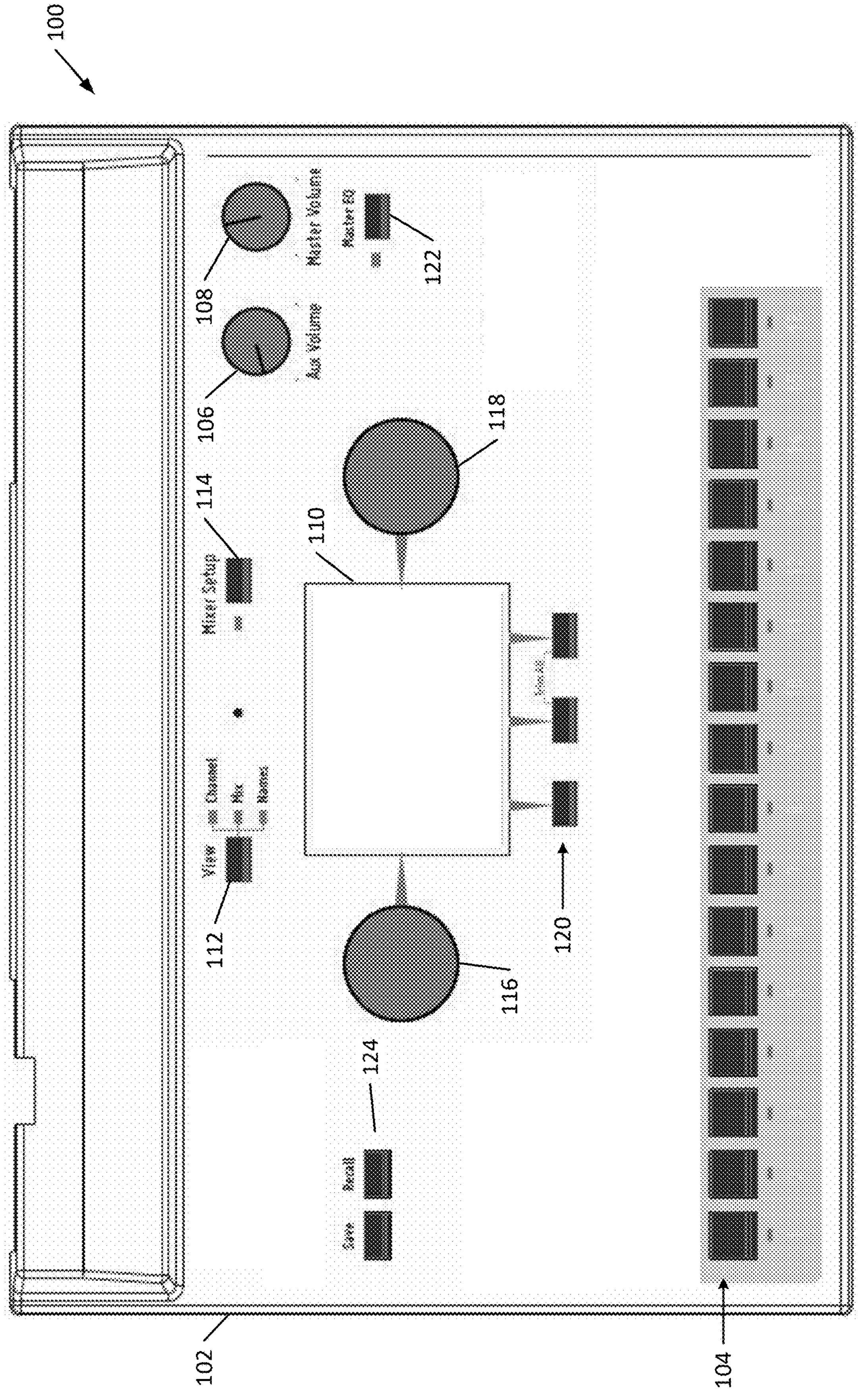
FIG. 1 shows an example audio device.
Figure 2:
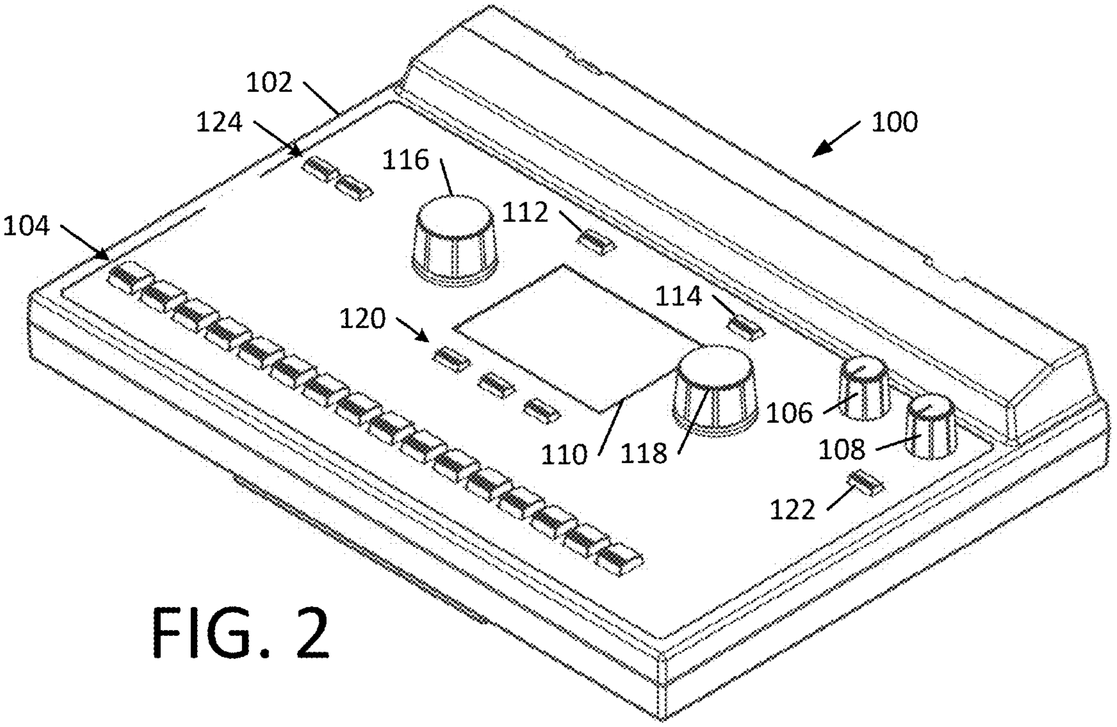
FIG. 2 shows another view of the example audio device of FIG. 1.

FIG. 1 shows an example audio device 100 in which aspects of the present disclosure may be implemented. FIG. 2 shows a perspective view of the example audio device 100. The example audio device 100 may comprise a personal mixing device for use in various monitoring, live performance, recording, and broadcast applications. Such a personal mixing device may be configured to receive, as inputs to the device, a plurality of individual "channels" of audio (audio input signals) that are "mixed" by a mixer function of the device to produce a mixed stereo output signal that a user may listen to via headphones or earbuds connected to audio outputs on a rear panel of the device (see, e.g., FIG. 3). As one example, the device 100 may be configured to receive up to 16 individual audio channel inputs or more, which may represent audio signals from different musical instruments (e.g., guitars, basses, keyboards, drums, etc.) or microphones. As described below, the personal mixing device 100 allows a user to adjust the volume and equalization characteristics (e.g., treble, bass, effects) of the audio input signals on an individual channel basis to produce a "mix" that most suits the needs of the user.

As shown in FIG. 1, in the personal mixing example, the audio device 100 may comprise a housing 102 that may house various electronic components described hereinafter. Various user interface controls, which may comprise buttons, rotary encoders, knobs, indicators or other types of user interface controls, may reside on the top surface of the housing 102 to enable a user to control features and functions of the device 100. The device 100 may further comprise a display 110 to indicate a variety of settings to a user and to provide visual feedback when controlling various features of the device. The display 110 may comprise a liquid crystal display (LCD). The display 110 may comprise another form of display, such as a CRT-based video display, a gas plasma-based display, or a touch-panel.

As examples of user interface controls, the audio device 100 may comprise one or more rotary encoders, such as, for example, left and right rotary encoders 116 and 118. These rotary encoders 116 and 118 may be used to assist a user in creating and editing a desired "mix" of the input audio signals, controlling settings of the audio device 100, selecting preferences, and controlling a variety of other user settings and functions of the device. Each of the rotary encoders 116 and 118 may also incorporate a push button switch so that, in addition to rotating the encoder to provide input to the device 100, the user may press down on the rotary encoder to provide an additional push-button control input via the same control element. The device 100 may further comprise additional control buttons 120 that can be used by a user to select or control other features presented to the user via the display 110.

The audio device 100 may further comprise "Save" and "Recall" buttons 124 that enable a user to save and recall particular combinations of settings, which may be referred to as "mix presets," in an onboard memory of the device. For example, as many as 16 different "mix presets" may be saved and recalled. Settings that may be saved as part of a "mix preset" may comprise, mode settings, audio channel settings including volume, mute status, panning, treble, bass, and effects level, master EQ settings, the last screen display view, among others.

As further examples, the audio device 100 may comprise a "View" button 112 which may enable a user to choose a plurality of different "views" on the display 110. For example, the "View" button may allow a user to cycle through each one of a "Channel View," a "Mix View," or a "Names View." The "Channel View" may display information on a per-channel basis, the "Mix View" may present information about each channel of a mix, and the "Names" view may display and enable a user to select different input channels for control and display based on a "Name" assigned to that input channel by the user.

The device 100 may further comprise a "Mixer Setup" button 114 that, when pressed, may cause the device to enter a mixer setup mode that presents a menu of mixer-related settings and controls via the display 110 to allow a user to control the mixing function of the audio device 102. When in this mixer setup mode, the availability of certain mixer functions may be indicated by displaying a name of the function on the display 110 above one of the additional control buttons 120 just below the display 110. Pressing the associated control button 120 may enable a user to use or control that feature or function.

Figure 3:
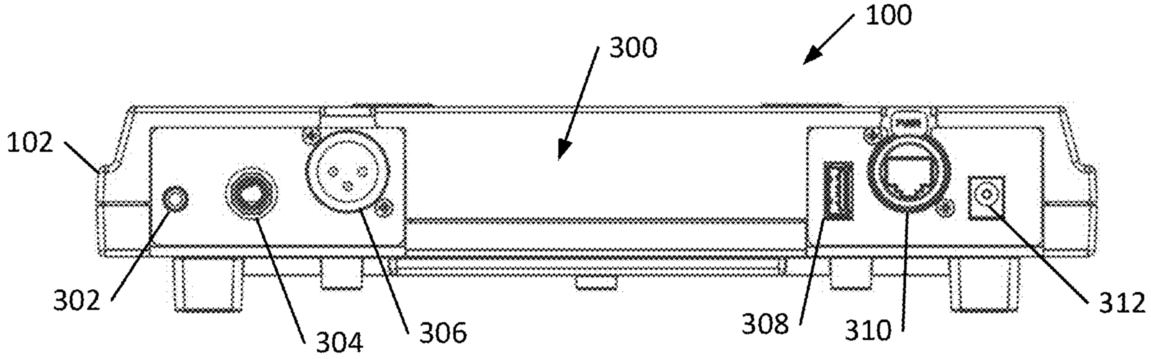
FIG. 3 shows a view of a rear panel of the example audio device shown in FIGS. 1 and 2.

The device 100 may further comprise an auxiliary volume knob 106 that may allow control of the volume of an auxiliary audio output provided via an auxiliary output jack on a rear panel of the device (see FIG. 3), as well as a master volume knob 108 that controls the master volume level of the stereo mix that may be heard when using headphones or earbuds connected to either ¼- or ⅛-inch output jacks on the rear panel (see also FIG. 3).

The device 100 may also comprise a "Master EQ" button 122. In addition to allowing equalization settings (e.g., treble, base, effects) to be controlled by a user on a per-channel basis, the device 120 may further provide the user, by pressing the button 122, the ability to apply master EQ settings to the overall stereo mix being sent to the ¼-inch and ⅛-inch outputs on the rear panel. The master EQ settings may also be applied to the audio output signal provided to the auxiliary audio output on the rear panel.

To enable a user to apply controls to each individual input audio channel, the audio device may further comprise a plurality of individual input channel selection buttons 104. For example, the device 100 may comprise one button for each of the different input channels. In the example shown, where the device 100 supports up to sixteen individual input channels, there are 16 input channel selection buttons. When a user presses one of the input channel selection buttons, the display 110, rotary encoders 116 and 118, and other control buttons 120 may be used to control settings (e.g., gain, treble, bass, effects) and provide visual feedback for aspects of the selected input channel.

The example audio device 100 may also comprise other control elements (not shown), such as other buttons, knobs, visual indicators, and touch screens to assist a user in controlling and using other features and functions of the audio device 100. The audio device 100 may be remotely controlled by applications running on smart phones, tablets, and computers.

FIG. 3 shows a view of an example rear panel 300 of the example audio device 100. A stereo audio signal (which may be a user-created "mix" of the individual input channels and which may be a filtered stereo audio signal as described hereinafter) may be output via one or more audio output jacks. For example, the stereo mix may be provided to both a ⅛-inch stereo output jack 302 and a ¼-inch stereo output jack 304. A user may listen to the mix by plugging a suitable listening device, such as headphones or in-ear monitors, into the appropriate jack 302/304 compatible with that device. The rear panel 300 may further comprise an auxiliary mono version of the mix via an XLR output 306. The mono version of the mix provided via the XLR output 306 may be sent to a variety of auxiliary audio devices, such as a wireless in-ear monitor transmitter, an audio recording device, a bass shaker device, powered speakers, etc. The volume of the mono mix provided at the XLR output 306 may be controlled via the auxiliary volume knob 106 of the device 100 as described above.

As further shown in FIG. 3, the rear panel of the audio device 100 may further comprise a USB connector 308. In some implementations, the USB connector may be used to connect an external computing device, such as a laptop, to the audio device 100 to perform firmware updates and other software-related functions. The USB port 308 may also be used to connect a standard USB memory device to the audio device 100 to enable a user to save and recall preferred mixer settings. The USB port 308 may also be used to download other types of information to the audio device 100 or to upload and save other types of information from the audio device 100. The rear panel 300 may also comprise a power connector 312 to enable the device to be powered via an external power supply.

Although a personal mixing device, such as the example audio device 100 shown in FIGS. 1-3, may include a plurality of individual input connectors (e.g., up to 16 or more) to receive each of the individual audio channel input signals that are mixed into the stereo mix that the device outputs, the example audio device 100 may be equipped with a single high-speed, low-latency audio input port 310 that receives all of the input channel signals via a single cable from a separate device (not shown) that multiplexes the individual channels and transmits them via the single cable. For example, the input port 310 may implement the high speed, low latency A-Net audio data transport protocol created by AVIOM, Inc. Upon receiving the multiplexed input channel signals via the input port 310, the multiplexed signals may be de-multiplexed for individual processing within the audio device, as described above and below.

Figure 4:
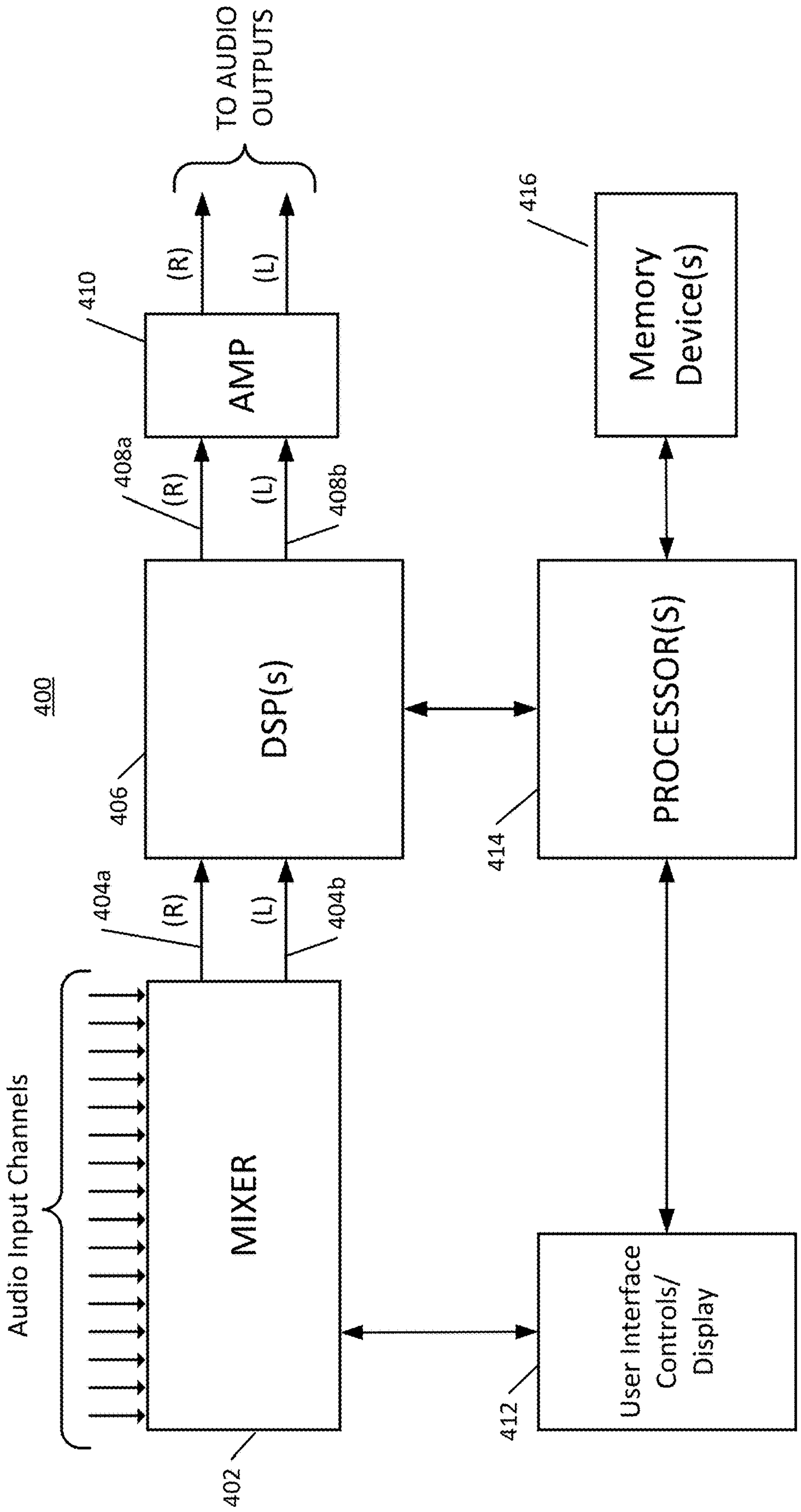
FIG. 4 shows an example architecture of the example audio device of FIGS. 1-3.

FIG. 4 shows an example electronic architecture of the audio device 100 shown in FIGS. 1-3. The components illustrated in FIG. 4 may be housed within the housing 102 of the device 100.

As shown, the architecture of the audio device may comprise mixer circuitry 402 that receives the plurality of individual audio channel signals input to the device, for example, after de-multiplexing the multiplexed audio channel signals received via the input port 310. As mentioned above, in one example, the device 100 may be configured to receive 16 or more individual audio channel inputs, which may represent audio signals from different musical instruments (e.g. guitars, basses, keyboards, drums, etc.) or microphones. The mixing circuitry 402, under user control provided via the user interface controls 104, 106, 108, 112, 114, 116, 118, 120, 124 and display 110 discussed above (collectively shown at 412 in FIG. 4), allows a user to adjust the volume, equalization, and other audio characteristics (e.g., pan (stereo placement), treble, bass, effects) of each of the audio input signals on an individual basis to produce a stereo "mix" that best suits the needs of the user. The stereo mix may comprise right (R) and left (L) audio signals output by the mixing circuitry on lines 404*a* and 404*b*, respectively.

In the example of FIG. 4, the mixer circuitry 402 comprises a two-dimensional (2D) stereo mixer with a left (L) 404*a* and right (R) 404*b* output signal. Alternatively, the mixer 402 may comprise a three-dimensional (3D) binaural audio mixer where the mixer circuitry 402 places audio objects in a three-dimensional space with control over position, depth, and directionality, and the outputs 404*a* and 404*b* may be binaural output signals. In such a binaural mixer example, the methods, apparatus and systems described herein may be used to enhance the placement accuracy of audio elements in 3D space, as well as to enhance the listener's experience, just as they do in a 2D stereo sound field as described hereinafter.

As further shown in FIG. 4, the example audio device 100 may further comprise one or more processors 414 that execute software and/or firmware that may be stored in one or more memory devices 416 of the device 100. The processor(s) 414 may comprise one or more general purpose processors, special purpose processors, conventional processors, coprocessors, microprocessors, controllers, microcontrollers, Application Specific Integrated Circuits (ASICs), Field Programmable Gate Array (FPGAs) circuits, or any other type of integrated circuit (IC), state machine, or the like capable of executing various functions of the audio device. The one or more processors 414 may receive user input via any one of the user input control elements of the device, such as the buttons, rotary encoders, and knobs 104, 106, 108, 112, 114, 116, 118, 120, 122 and 124 shown in FIGS. 1-2 (and shown collectively at 412 in FIG. 4). The one or more processors 414 may cause information and visual controls to be displayed via the display 110 of the audio device 100.

The memory devices 416 may be coupled to the one or more processors 414 and may comprise random access memory (RAM) and read only memory (ROM). Such memories comprise circuitry that allows information to be stored and retrieved. ROMs generally contain stored data that may not easily be modified. Data stored in RAM may be read or changed by the one or more processors or other hardware devices. Access to RAM and/or ROM may be controlled by a memory controller (not shown). The memory controller may provide an address translation function that translates virtual addresses into physical addresses as instructions are executed. The memory controller may also provide a memory protection function that isolates processes within the system and isolates system processes from user processes. Thus, a program running in a first mode may access only memory mapped by its own process virtual address space; it may not access memory within another process's virtual address space unless memory sharing between the processes has been set up.

Any or all of the methods, apparatuses, systems, and processes described herein may be embodied in the form of computer executable instructions (e.g., program code) stored on a computer-readable storage medium, such as the memory device(s) 416, which instructions, when executed by one or more processors, such as the one or more processors 414 or one or more DSPs 406, cause the one or more processors 414 and/or DSPs 406 to perform and/or implement the methods, apparatuses, systems, and processes described herein. Specifically, any of the steps, operations, or functions described herein may be implemented in the form of such computer executable instructions, executing on the processor(s) 414 or DSPs 406 (e.g., as a DSP audio plugin) of an audio device, such as the audio device 100 of FIGS. 1-4. Computer readable storage media, such as the memory device(s) 416 may comprise volatile and nonvolatile, removable and non-removable media implemented in any non-transitory (e.g., tangible or physical) method or technology for storage of information, but such computer readable storage media do not comprise signals. Such non-transitory computer readable storage media comprise, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information or computer-executable instructions and which may be accessed by an audio device or other computing device.

As further shown, the right (R) and left (L) audio signals of the stereo mix created, based on user input, via the mixer circuitry 402 may be output from the mixer circuitry 402 on lines 404*a* and 404*b*, respectively. As shown, the audio signal components of the stereo mix may be provided to one or more digital signal processors (DSPs) 406. The functionality of the one or more DSPs may be controlled via the user interface controls 412 and/or via the one or more processors 414. As described hereinafter, the DSP(s) 406 may apply various digital audio filtering to the right (R) and left (L) audio signals of the mix produced by the mixing circuitry to provide a filtered stereo audio output signal, again comprising left and right signal components. The left and right filtered stereo audio output signals may be output from the DSP(s) via lines 408*a* and 408*b*. As further shown, the filtered stereo output signal may be amplified by one or more amplifier circuits 410 and ultimately sent to the audio output connectors of the audio device 100, such as, for example, the ¼-inch and ⅛-inch output connectors 302 and 304 on the rear panel 300 of the audio device 100. As further mentioned, a mono version of the filtered audio output signal may be output via the XLR connector 306 on the rear panel 300.

The DSPs 406 may comprise one or more off-the-shelf DSP chips supplied by manufacturers, such as ANALOG DEVICES, and/or may comprise one or more custom DSPs implemented, for example, via any application specific integrated circuit (ASIC), field programmable gate array (FPGA) or other gate array or integrated circuit technology. The audio algorithms implemented by the DSPs 406 may include user adjustable individual- and group-channel volume, equalization, dynamics, audio sweetening effects, and sound field positional placement (stereo and/or 2D/3D).

The example audio device 100 shown in FIGS. 1-4 is just one example of an audio device in which the aspects of the present disclosure may be implemented. It is understood that the methods, apparatus, and systems described herein are not limited to use in an audio device that comprises a personal mixing device, but rather may be employed in a wide variety of different types of audio devices, such as, for example, headphone amplifiers, in-ear monitor (IEM) amplifiers, wireless IEM devices, headphones, earphones, mixing consoles, audio DSP plugins running natively on audio systems, or as universal plugins, for example VST, AU, AAX, etc. type plugins, running on audio systems and/or on generic computer hardware, telephones, mobile phones, or other personal listening devices.

Hearing loss is a common problem among humans. Hearing information, which is sometimes referred to as an audiogram, is the typical output of a hearing test performed on a user by an audiologist, indicating the extent to which the user is exhibiting hearing loss at different frequencies. It is common for people to have both overall loss, which is common to both ears, and spatial loss (sometimes also referred to as differential loss or asymmetric loss) where the ears have different losses at different frequencies. Spatial loss causes stereo and/or 2D/3D positional audio information to be skewed in its spatial presentation. Some users may exhibit profound hearing loss at certain frequencies indicating potential cochlear dead region(s) in one or both ears. Yet other users may experience profound unilateral hearing loss in which usable hearing is only capable through one ear.

Figure 5A:
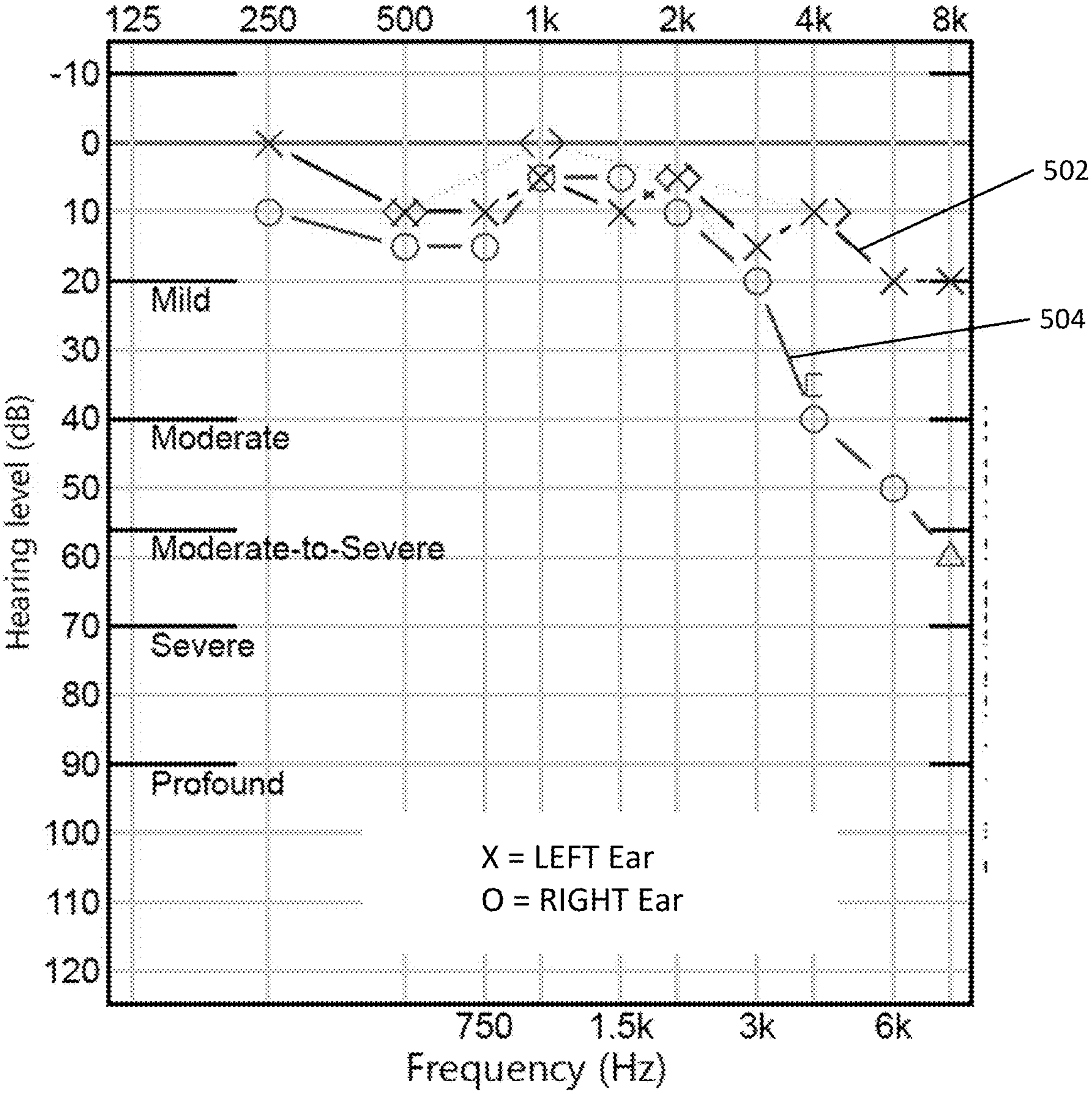
FIG. 5A shows example hearing information.

FIG. 5A shows example hearing information 500 indicative of hearing loss exhibited by an example user. The hearing information 500 may comprise an audiogram. The hearing information 500 may be the result of a hearing test performed on the user by an audiologist or by a self-performed hearing test built into device 100 (as described more fully below). The hearing information 500 may indicate, for each of the left and right ears of the user, an amount of hearing loss exhibited at each of a plurality of frequencies. For example, the hearing information 500 may indicate an amount of hearing loss exhibited by the user at each of ten different audible frequencies. Those frequencies may include, without limitation, 250 Hz, 500 Hz, 750 Hz; 1 kHz, 1.5 kHz, 2 kHz, 3 kHz, 4 kHz, 6 kHz, and 8 kHz. The amount of hearing loss at each frequency may be specified in decibels (dB). In the example of FIG. 5A, values for the left ear are shown with "X"s, and values for the right ear are shown with "O"s. For example, as shown in the example of FIG. 5A, at 250 Hz, the user exhibits zero decibels of hearing loss in the user's left ear and 10 dB of loss in the right ear. At 8 kHz, the user exhibits 20 dB of hearing loss in the left ear, and 60 dB of hearing loss in the right ear. As further shown in FIG. 5A, a curve may be fitted based on the individual data points for each ear. In this example, the curve for the left ear is shown at 502, and the curve for the right ear is shown at 504. The hearing information 500 may be expanded to provide hearing loss at additional frequencies below 250 Hz and/or above 8 kHz. For example, the frequencies for which hearing loss data is provided may extend from 125 Hz up to 16 kHz. For example, hearing loss data may be provided at each of the following frequencies 125 Hz, 250 Hz, 500 Hz, 750 Hz, 1 kHz, 1.5 kHz, 2 kHz, 3 kHz, 4 kHz, 6 kHz, 8 kHz, 10 kHz, 11.2 kHz, 12.5 kHz, 14 kHz, and 16 kHz.

In the example of FIG. 5A, it can be seen that this example user exhibits substantially the same amounts of hearing loss in both ears up to about 3 kHz, but then the right ear begins to exhibit greater hearing loss from 3 kHz to 8 kHz. In this example, the difference in the amount of hearing loss at 8 kHz is about 40 dB. As mentioned above, when a user has different losses at a given frequency, the user's perception of stereo and/or 2D/3D positional audio information may be skewed in its spatial presentation. Both overall losses (general loss in both ears) and spatial losses (different losses between ears) prevent a user from experiencing (i.e., perceiving) stereo and/or 2D/3D positional audio information in the manner intended by the creator of such stereo or positional audio information.

In accordance with one aspect of the methods, apparatus, and systems described herein, the hearing information (e.g., audiogram) of a user may be provided as input to the audio device 100. As described in greater detail hereinafter, in one implementation, the hearing information of a user may be manually input by the user using the display 110 and one or more of the user input control elements (i.e., user interface elements) of the audio device 100, such as the buttons, rotary encoders, and knobs 104, 106, 108, 112, 114, 116, 118, 120, 122 and 124 (shown in FIGS. 1-2 and shown collectively at 412 in FIG. 4).

As one example of manual entry, a table may be displayed on the display 110 of the audio device, and a user may manually enter into the table the frequencies and hearing loss values from the user's hearing information. An example of such a table is shown below as Table 1.

TABLE 1

| Hearing Information | | |
|---|---|---|
| Frequency (in Hz) | Left Ear Loss (in dB) | Right Ear Loss (in dB) |
| 250 | 0 | 10 |
| 500 | 10 | 15 |
| 750 | 10 | 15 |
| 1k | 5 | 5 |
| 1.5k | 10 | 5 |
| 2k | 5 | 10 |
| 3k | 15 | 20 |
| 4k | 10 | 40 |
| 6k | 20 | 50 |
| 8k | 20 | 60 |

As shown, the frequencies for which hearing loss values are provided may be entered in the first column. Alternatively, the table may be pre-populated with the most common frequencies provided by audiologists when testing the hearing of a user. As mentioned above, this table may be expanded to include frequencies as low as 125 Hz (or lower) and as high as 16 kHz (or higher) such as the following example frequencies: 125 Hz, 250 Hz, 500 Hz, 750 Hz, 1 kHz, 1.5 kHz, 2 kHz, 3 kHz, 4 kHz, 6 kHz, 8 kHz, 10 kHz, 11.2 kHz, 12.5 kHz, 14 kHz, and 16 kHz. The hearing loss values at each frequency may then be entered in the second (left ear) and third (right ear) columns. As an example, a user of the audio device 100 of FIGS. 1-4 may use the rotary encoders 116 and 118 of the device to navigate the displayed table and enter the appropriate values in each column and row of the table (e.g., decibels (dB) of hearing loss exhibited by each ear at each frequency). If no hearing loss value is available for any one or more of the listed frequencies, the audio device 100 may be configured to interpolate values for those frequencies based on the available data for surrounding frequencies. Alternatively, or in addition, the hearing information alternatively may be input to the audio device 100 by downloading the hearing information from another computing device (USB memory stick, laptop, tablet, mobile phone, etc.) using, for example, the USB connector 308 on the rear panel 300 of the audio device 100. Alternatively, or in addition, the hearing information may be input to the audio device 100 via a built-in hearing test, as described more fully below.

Figure 5B:
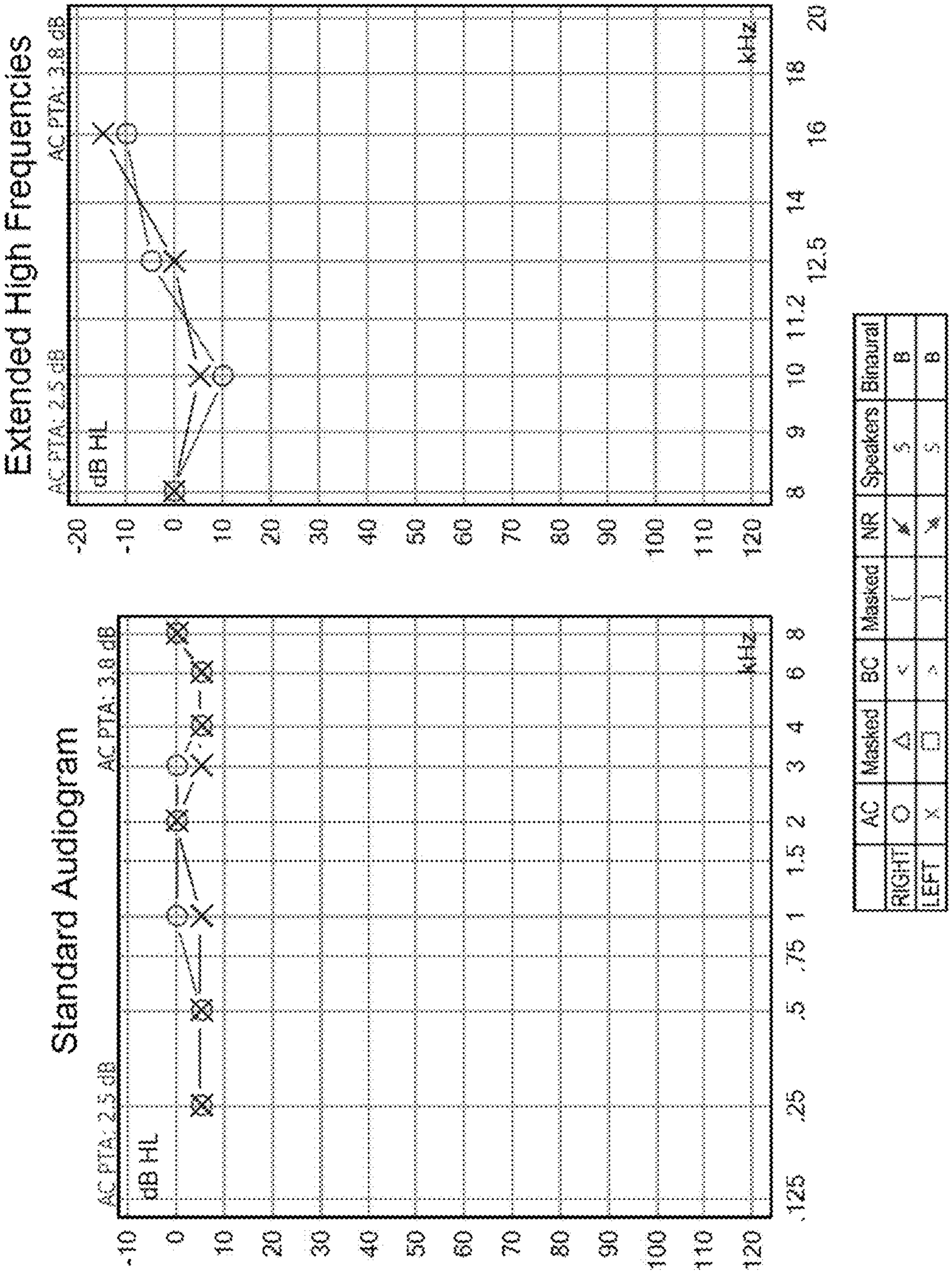
FIG. 5B shows example hearing information.

In accordance with another aspect of the methods, apparatus, and systems described herein, the hearing information of a user that is input to the audio device 100 may be matched with one of a plurality of "common" (i.e., known or recognizable) hearing profiles. The plurality of common hearing profiles may comprise one or more of the following:

Normal. The hearing information of a user may be matched to the "normal" profile if the information indicates little to no loss of hearing across all of the frequencies included in the hearing information. FIG. 5B shows an example of hearing information (e.g., an audiogram) of a user whose profile would be matched to (i.e., classified as) the "normal" profile. A user whose hearing information is matched to the "normal" common profile may not need or benefit from any form of hearing loss compensation.

Figure 5C:
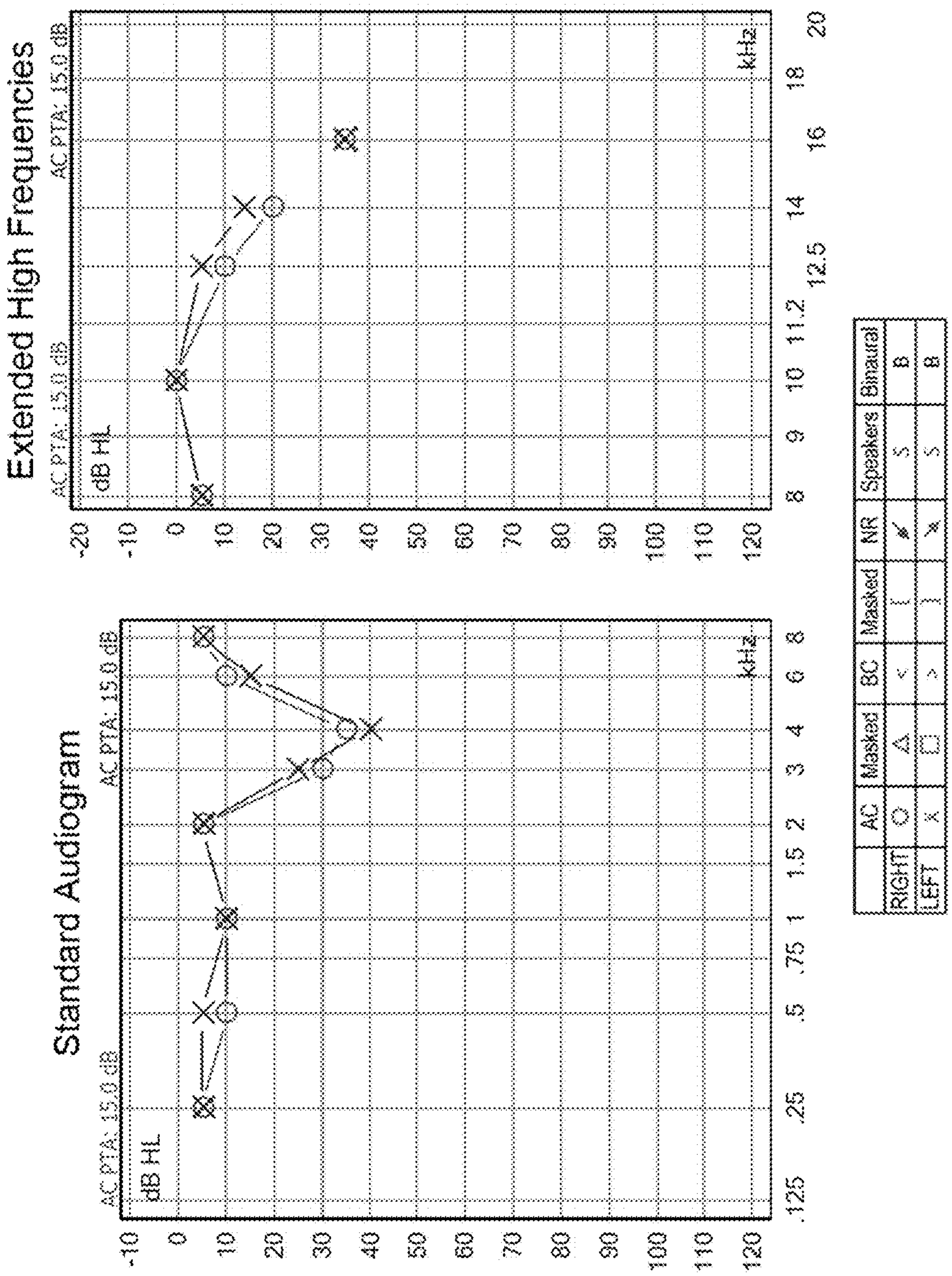
FIG. 5C shows example hearing information.

Symmetrical. The hearing information of a user may be matched to the "symmetrical" hearing profile if the information indicates that the difference between any hearing loss in the left and right ears at each frequency included in the hearing information does not exceed a predetermined threshold. As one example, the threshold may be 10 dB. That is, if the difference between any hearing loss in the left and right ears at each frequency in the profile does not exceed 10 dB, the user's hearing information would be matched with the symmetrical hearing profile. In other examples, the threshold may be different. For example, the threshold may comprise 15 dB. FIG. 5C shows an example of hearing information (e.g., an audiogram) of a user whose profile may be matched to the "symmetrical" profile. In this example, while the user exhibits 40 dB of hearing loss at 4 kHz, that loss is symmetrical—it is not significantly different between the left and right ears (e.g., the difference between the left and right ears does not differ by more than the 10 dB threshold). The 15-20 dB loss at 14 kHz is also symmetrical. Note that this user's profile may also be matched to the mid-range dip profile (discussed below).

Figure 5D:
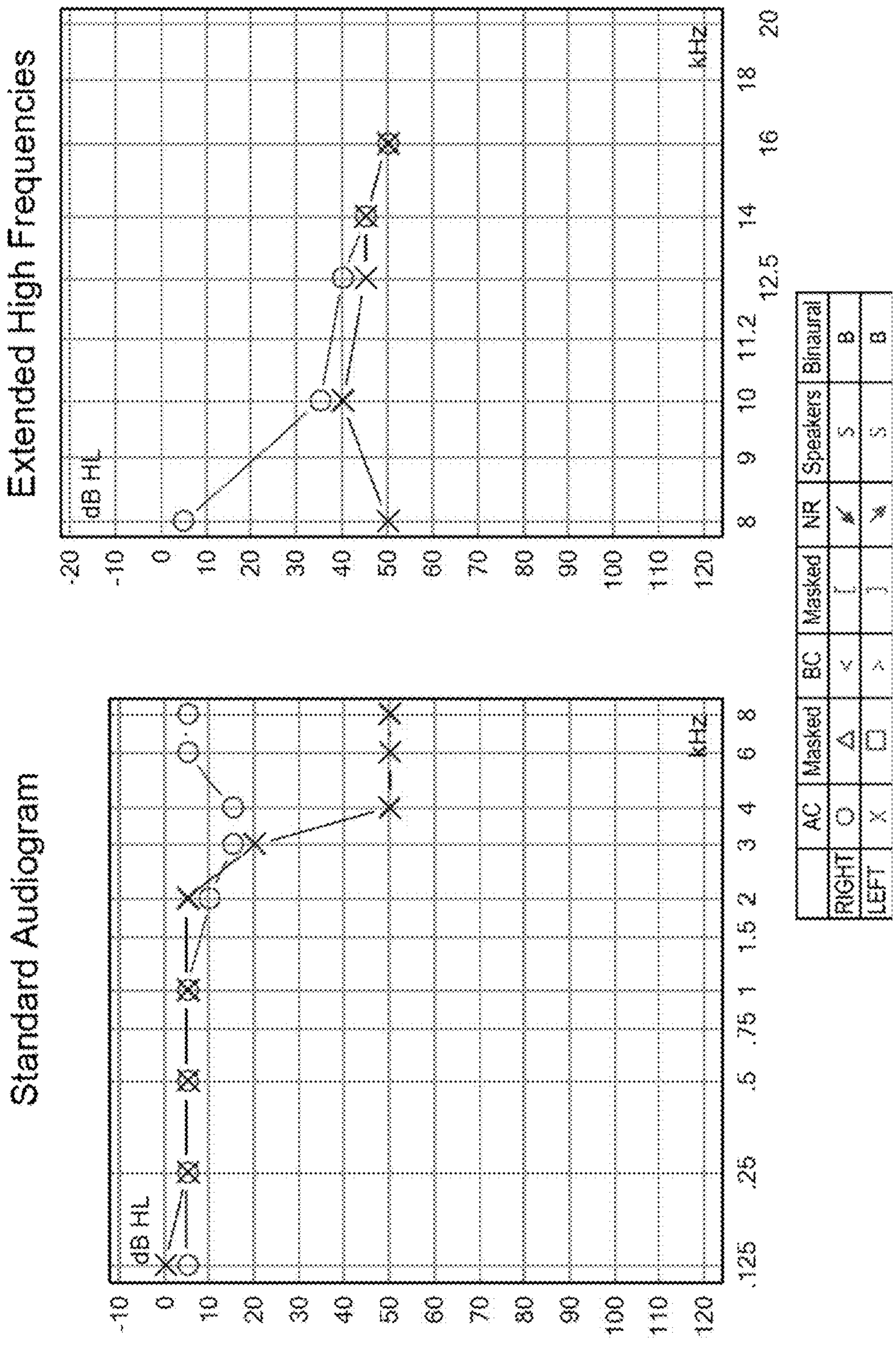
FIG. 5D shows example hearing information.

Asymmetrical. The hearing information of a user may be matched to the "asymmetrical" hearing profile if the information indicates that the difference between any hearing loss in the left and right ears at any frequency included in the hearing information exceeds a predetermined threshold. As one example, the threshold may be 10 dB. That is, if the difference between the hearing loss in the left and right ears at any frequency in the profile exceeds 10 dB, the user's hearing information would be matched with the asymmetrical hearing profile. FIG. 5D shows an example of hearing information (e.g., an audiogram) of a user whose profile may be matched to the "asymmetrical" profile, as the differential loss at 4 kHz, 6 kHz, and 8 kHz exceeds 10 dB. Note that this example user exhibits relatively symmetrical loss at the frequencies above 10 kHz.

Mid-range Dip. The hearing information of a user may be matched to the mid-range dip hearing profile if the information indicates significant loss (i.e., above a threshold such as 10 dB) in mid-range frequencies, but less loss at higher frequencies. FIG. 5C shows an example of hearing information (e.g., an audiogram) of a user whose profile may be matched to the "mid-range dip" profile, as the information shows significant loss of hearing in the 3 kHz to 6 kHz range but less loss at higher frequencies.

Figure 5E:
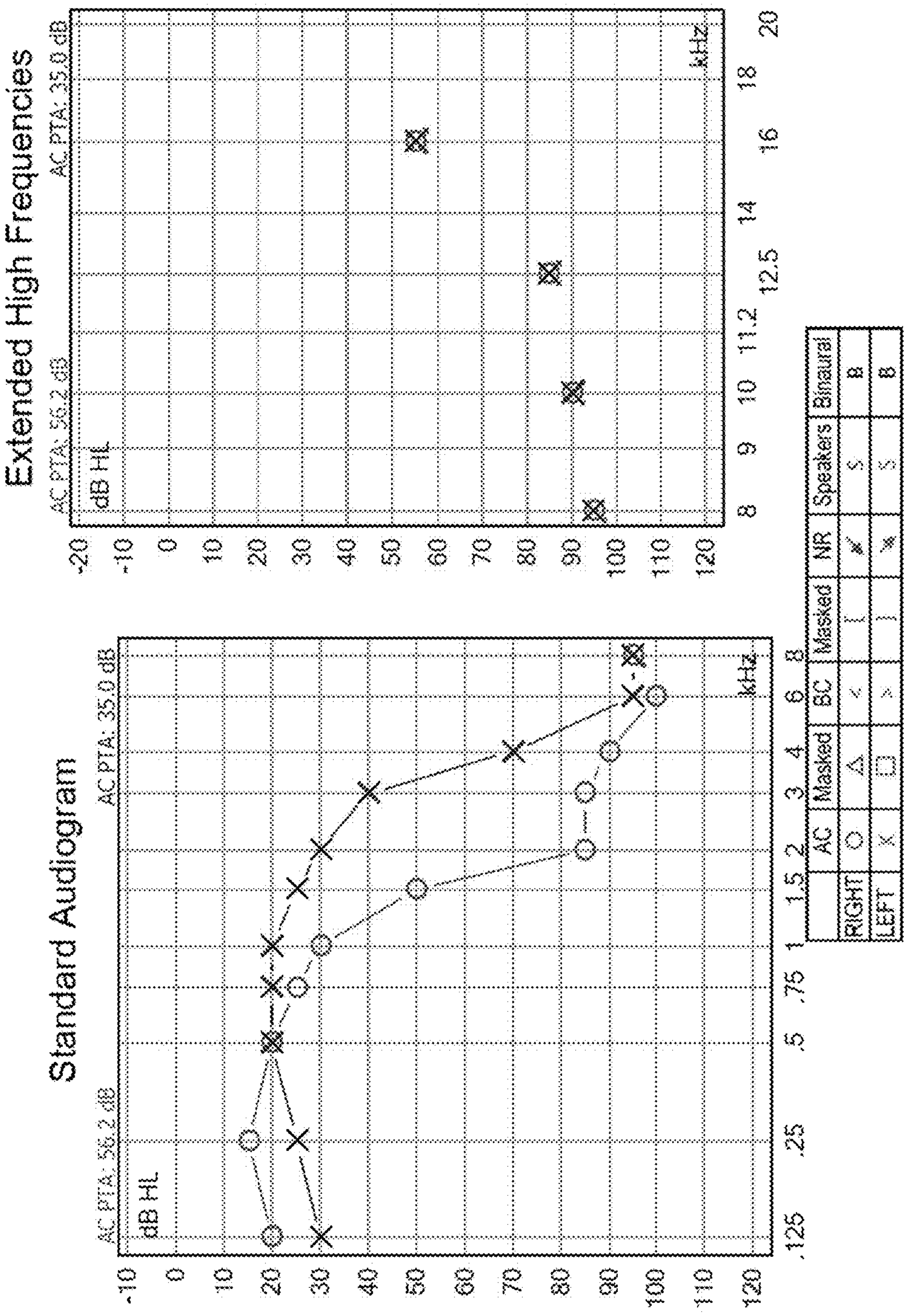
FIG. 5E shows example hearing information.

Cochlear Dead Region. The hearing information of a user may be matched to the "cochlear dead region" profile if the information indicates a hearing loss of 90 dB or greater at a particular frequency or range of frequencies. FIG. 5E shows an example of hearing information of a user whose profile may be matched to the "Cochlear Dead Region" profile. As shown, the information indicates a possible cochlear dead region in the 6 kHz-8 KHz frequency range.

Profound Unilateral. The hearing information of a user may be matched to the profound unilateral profile if the information indicates that the user has usable hearing in only one ear (not shown).

According to another aspect of the methods, apparatus, and systems described herein, compensation for a user's hearing loss may be provided in an audio device, such as the audio device 100, based on the hearing information of a user input to the audio device, by applying one or more different forms of hearing loss compensation (e.g., signal filtering or other correction) to an audio signal output via the audio device, while also enabling a user to control the degree to which the one or more different forms of hearing loss compensation (i.e., correction) are applied to an audio signal output via the audio device. As examples described in greater detail hereinafter, the different forms of hearing compensation control that may be provided by the audio device may comprise, but is not limited to, overall EQ correction, differential EQ correction, secondary EQ correction, EQ tilt control, control of dynamics, CROS correction, and/or dead region ducking. The methods, apparatus, and systems described herein may be used to enhance the individual listening experience in professional, prosumer, and consumer listening environments and may be used when listening with headphones, in-ear-monitors (IEMs), or speakers.

Figure 6:
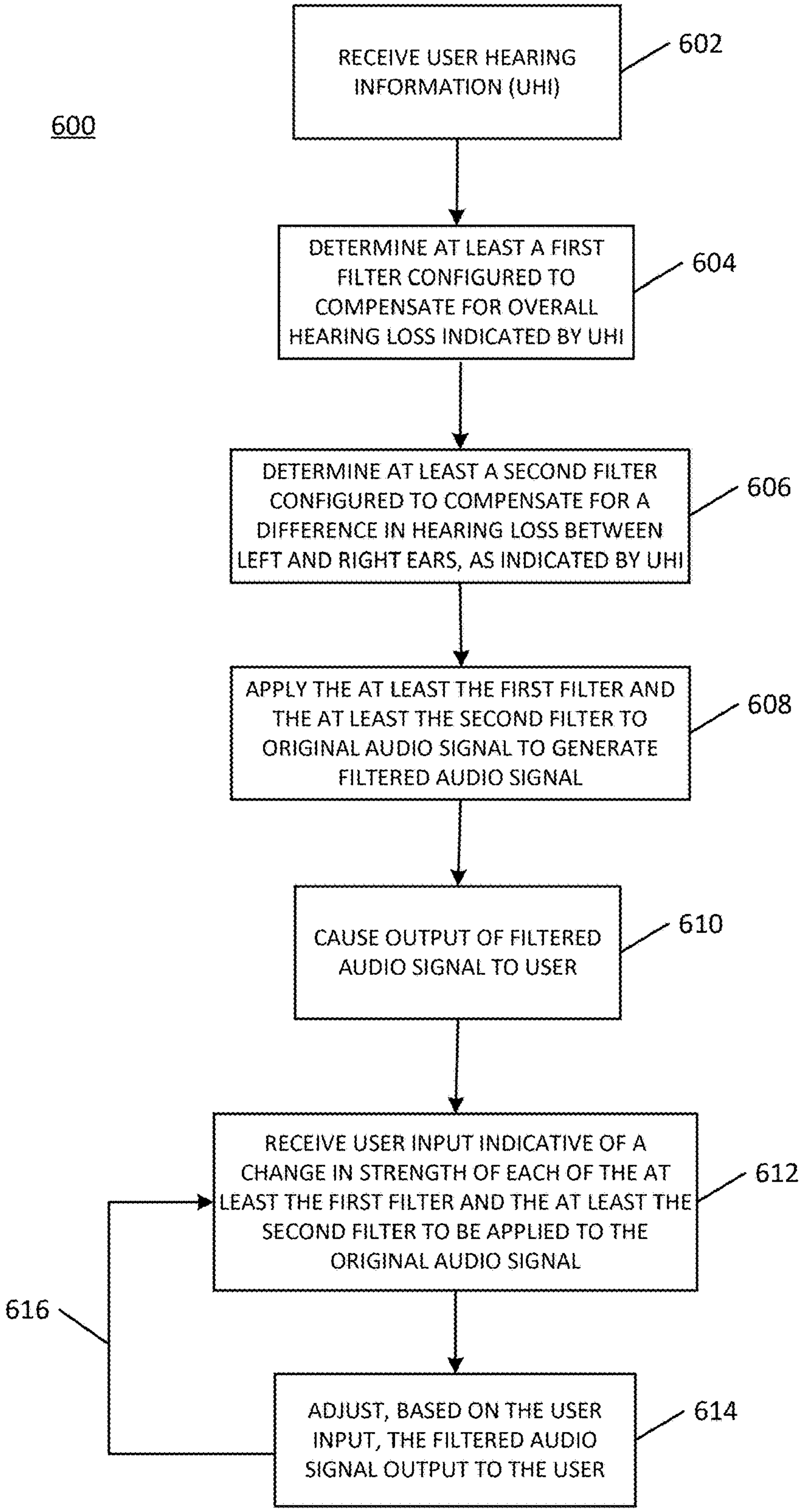
FIG. 6 shows an example method.

FIG. 6 shows an example method 600 for enabling user control of overall EQ correction and/or differential EQ correction of an audio signal output by an audio device. The example method 600 may be used to compensate for hearing loss exhibited by a user when presenting stereo audio information to the user. The method may be employed, for example, in an audio device, such as the audio device 100 described above and shown in FIGS. 1-4. The method may be employed in a wide variety of other types of audio device including, without limitation, headphone amplifiers, in-ear monitor (IEM) amplifiers, wireless IEM devices, headphones, earphones, mixing consoles, audio DSP plugins running natively on audio systems, or as universal plugins, for example VST, AU, AAX, etc. type plugins, on audio systems and/or on generic computer hardware, telephones, mobile phones, or other personal listening devices. The method 600 may be used to enhance the individual listening experience in professional, prosumer, and consumer listening environments when a user is listening with headphones, in-ear-monitors (IEMs), or speakers.

As shown in FIG. 6, at step 602, hearing information of a user may be received by an audio device, such as the audio device 100 of FIGS. 1-4. The hearing information may indicate, for each of the left and right ears of the user, an amount of hearing loss exhibited by the user at each of a plurality of frequencies. The hearing information (e.g., audiogram) may be the result of a hearing test performed on the user by an audiologist. As described above, the hearing information may be manually entered by a user. Alternatively, the hearing information may be received via download from another computing device, for example, via the USB connector 308 on the rear panel 300 of the audio device. As mentioned above and described more fully below, the hearing information may alternatively, or in addition, be generated by a user-performed hearing test capability built-in to the audio device 100. When a hearing test capability is built-in to, and administered by, the audio device 100, the method 600 may be used to provide individualized listening optimization in a user's listening environment that accounts not only for the user's hearing loss, but also for the nonlinearities of the user's listening equipment and environment.

At step 604, based on the received hearing information, at least a first audio filter may be determined (e.g., calculated, generated, or otherwise automatically determined). The at least the first audio filter may be determined by program code (i.e., computer-executable instructions) executing on the one or more processors 414 and/or the one or more DSPs 406 of the audio device 100 of FIGS. 1-4, based on the received hearing information of the user. The at least the first audio filter may be configured to compensate for an overall hearing loss, common to both the left and right ears of the user, as indicated by the hearing information. Because hearing profiles of different users are likely to vary widely, the at least the first audio filter determined by the one or more processors 414 and/or one or more DSPs 406 for one user, may be different than the at least the first filter determined for another user. Thus, the method 600 is able to enhance the individual listening experience on a per-user basis.

The at least the first audio filter may comprise a first plurality of filters, each having a center frequency corresponding to one of the plurality of frequencies for which hearing loss values are provided in the hearing information (e.g., one filter for each frequency tested). In some implementations, the plurality of filters may include one or more additional filters having center frequencies above or below those indicated in the hearing information, which center frequencies may be determined by extrapolation from the hearing information. The center frequencies and bandwidths of the plurality of filters may be calculated, generated, or otherwise automatically determined such that together they cover the full range of frequencies audible to humans (e.g., 20 Hz to 20 kHz) (even though the hearing information provided by the user may only cover frequencies in the range of 250 Hz to 8 kHz or less).

In one example, the first plurality of filters may be determined by first determining which of the left or right ears of the user exhibits the least hearing loss across the range of frequencies, and then determining (e.g., calculating, generating, etc.) the first plurality of filters using the hearing loss values associated with the ear determined to exhibit the least hearing loss across the range of frequencies. In one example implementation, determining which ear of the user exhibits the least hearing loss across the range of frequencies may comprise summing the hearing loss values at each frequency for each ear, and then determining which sum is the lowest. If both ears have the same hearing loss sum, then the selection may be arbitrary. For example, if both ears have the same hearing loss sum, the hearing information for the left (L) ear may be arbitrarily selected as the ear with the least hearing loss.

Each of the first plurality of filters may have a determined center frequency, gain and bandwidth (e.g., Q) calculated such that together, the frequency response of the first plurality of filters across the range of frequencies (e.g., 20 Hz to 20 kHz) may approximate the inverse of the hearing loss curve (e.g., curve 502 or 504 in FIG. 5A) of the ear determined to exhibit the least hearing loss across the range of frequencies. When applied to an original audio signal, the first plurality of filters may be applied to both the left (L) and right (R) audio signal components of the original audio signal. Together, the first plurality of filters may form a multi-band stereo parametric equalization (EQ) filter, where each band of the parametric EQ filter is associated with a different one of the plurality of frequencies for which hearing loss values are provided in the hearing information.

With the goals of providing filter gains that approximate the inverse of the user's hearing loss common to both ears and to extend filter correction beyond the limited range of frequencies in the hearing information (e.g. 250 Hz to 8 kHz) to cover the complete hi-fidelity audio frequency spectrum (e.g., 20 Hz to 20 kHz), filter bandwidth (Q) of the first plurality of filters may be determined based on the frequencies for which hearing loss information is provided in the hearing information and their separation from each other when filter center-frequencies are set at the frequencies in the hearing information (e.g., 250 Hz, 500 Hz, 750 Hz, 1 kHz, 1.5 kHz, 2 kHz, 3 kHz, 4 kHz, 6 kHz, and 8 kHz or other expanded higher or lower frequencies). Gain at each frequency may be algorithmically determined based on direct proportionality of the hearing loss common to both ears at each hearing profile frequency and extrapolated to cover the full audio frequency spectrum (e.g., 20 Hz to 20 kHz). For example, the gain settings at each frequency indicated in the hearing information may be automatically calculated to be the inverse of the hearing loss at each such frequency. For missing test data at filter points between the indicated (i.e., tested) frequencies, a simple linear interpolation may be used. For frequencies beyond the frequencies indicated in the hearing information, i.e., above the highest and below the lowest tested frequencies but still in the 20 Hz to 20 KHz range of human hearing, shelf filters may be utilized based on the highest and lowest frequency test points in the hearing information. Alternatively, more sophisticated loss-trend analysis, perhaps using AI or machine learning, can be performed to more accurately predict and implement loss above and below the tested frequencies indicated in the hearing information of the user. The filter Q value at each frequency may be predetermined based on the spacing between adjacent center-frequencies (e.g., 904*a*-1 in FIG. 9) at each tested frequency in the hearing information, so that together the filters provide a smooth overall filter response (as shown, for example, at line 902 in FIG. 9). Alternatively, more sophisticated analysis based on the delta (slope) of adjacent gain values, perhaps using AI or machine learning, can be performed to more accurately adjust Q values to present a smooth, accurate overall filter response across the full range of tested and/or interpolated frequencies.

Alternatively, or in addition, algorithms or artificial intelligence (e.g., machine learning models) may be used to determine the ideal number, order and architecture, and gain, Q, and center frequency of a plurality of filters needed to provide accurate compensation for the hearing loss common to both ears and covering the entire hi-fidelity audio frequency spectrum. Partially because a user's brain learns to compensate itself, to a certain degree, for the user's hearing loss, ideal filter-gain strength may be lower than actual hearing loss, making real-time user control of filter strength of the at least the first plurality of filters a beneficial capability for an optimized user experience. Filter parameters may be determined for standard or non-standard hearing information (e.g., audiogram) frequencies.

At step 606, based on the received hearing information, at least a second audio filter may be determined (e.g., calculated, generated, or otherwise automatically determined). The at least the second audio filter may be determined by the one or more processors 414 and/or one or more DSPs 406 of the audio device 100 of FIGS. 1-4, based on the received hearing information of the user. The at least the second audio filter may be configured to compensate for a difference in hearing loss, between the left and right ears of the user, as indicated by the hearing information. Again, the at least the second audio filter determined for one user may be different than the at least the second filter determined for another user.

The at least the second audio filter may comprise a second plurality of filters, each having a center frequency corresponding to one of the plurality of frequencies for which hearing loss values are provided in the hearing information (e.g., one filter for each of the frequencies tested). In one example, the second plurality of filters may be determined by first determining, based on the hearing information, a difference between the amount of hearing loss indicated, at each of the plurality of frequencies, for the left ear and the amount of hearing loss indicated, at each of the plurality of frequencies, for the right ear. The difference in hearing loss at each frequency may be determined by subtracting the hearing loss value of one ear from the hearing loss value of the other ear. For example, using the example hearing information listed in Table 1, the difference in hearing loss between the right ear and the left ear at 4 kHz is 30 dB (i.e., 40 dB minus 10 dB). Once the difference in hearing loss at each frequency is determined, the second plurality of filters may be determined using the determined differences at each frequency.

Each of the second plurality of filters may have a determined center frequency, gain and bandwidth (e.g., Q) calculated such that together, the frequency response of the second plurality of filters across the full audible frequency range (e.g., 20 Hz to 20 kHz) may approximate the inverse of the difference between the hearing loss curves (e.g., curve 502 and 504 in FIG. 5A) of the left and right ears, as indicated by the hearing information.

In one example implementation, the second plurality of filters may be applied only to the one of the left (L) or right (R) audio signal components of the original stereo audio signal corresponding to the ear (left or right) that exhibits the most hearing loss across the range of frequencies. In this respect, together, the second plurality of filters may form a multi-band mono parametric equalization (EQ) filter, where each band of the parametric EQ filter is associated with a different one of the plurality of frequencies for which hearing loss values are provided in the hearing information. In one implementation, if both ears have the same hearing loss sum, then the second plurality of filters may be applied to the ear that is the opposite of the ear selected for generation of the first plurality of filters (general loss profile) as described above. For example, if the first plurality of filters was generated based on the hearing information of the left (L) ear, then if it is determined in this step that both ears have the same hearing loss sum, the opposite ear (e.g., right (R) ear) may be selected as the ear with the most hearing loss for purposes of this step.

With the goals of providing filter gains that are the inverse of the user's differential (difference between left ear and right ear) hearing loss and to extend filter correction beyond the limited range of frequencies in the hearing information (250 Hz to 8 kHz) to cover the complete hi-fidelity audio frequency spectrum (20 Hz to 20 kHz), filter bandwidth (Q) may be determined based on the hearing profile frequencies and their separation from each other when filter center-frequencies are set at the hearing profile frequencies. Gain at each frequency may be algorithmically determined based on the differential hearing loss at each frequency in the hearing information. For example, the gain settings at each frequency indicated in the hearing information may be automatically calculated to be the inverse of the hearing loss differential at each such frequency. For missing test data at filter points between the indicated (i.e., tested) frequencies, a simple linear interpolation may be used. For frequencies beyond the frequencies indicated in the hearing information, i.e., above the highest and below the lowest tested frequencies but still in the 20 Hz to 20 kHz range of human hearing, shelf filters may be utilized based on the highest and lowest frequency test points in the hearing information. Alternatively, more sophisticated loss-trend analysis, perhaps using AI or machine learning, can be performed to more accurately predict and implement loss above and below the tested frequencies indicated in the hearing information of the user. The filter Q value at each frequency may be predetermined based on the spacing between adjacent center-frequencies (e.g., **914*a*-1 in FIG. 10) at each tested frequency in the hearing information, so that together the filters provide a smooth overall filter response (as shown, for example, at line 912 in FIG. 10**). Alternatively, more sophisticated analysis based on the delta (slope) of adjacent gain values, perhaps using AI or machine learning, can be performed to more accurately adjust Q values to present a smooth, accurate overall filter response across the full range of tested and/or interpolated frequencies.

Alternatively, or in addition, algorithms or artificial intelligence may be used to determine the ideal number and gain, Q, and center frequency of a plurality of filters needed to provide accurate compensation for differential hearing loss and covering the entire hi-fidelity audio frequency spectrum. Because a user's brain naturally learns to compensate, to a certain degree, for the user's differential hearing loss, ideal filter-gain strength may be lower than actual hearing loss, making real-time user control of filter strength of the at least the second plurality of filters a beneficial tool for an optimized user experience. Filter parameters may be determined for standard or non-standard hearing information (e.g., audiogram) frequencies.

In the case of an implementation in which the audio device 100 comprises a telephone or mobile phone, the at least the first filter(s) and the at least the second filter(s) may perform differently depending on to which ear the user raises the device. For example, the device may auto-sense left or right ear listening and adjust the frequencies, gains, and Q of the filters based on the hearing information for the ear to which the device is raised.

At step 608, the at least the first filter and the at least the second filter may be applied to an original audio signal to generate a filtered audio signal. Applying the at least the first and the at least the second audio filters to the original audio signal may be performed, for example, by the one or more DSPs 406 of the audio device architecture 400 shown in FIG. 4. For example, the original audio signal to which the at least the first and the at least the second filters are applied may comprise the left (L) and right (R) components of the stereo audio signal "mix" output by the mixer 402 on lines **404*a* and 404*b*. In that example, the filtered audio signal may comprise the left (L) and right (R) components of the filtered stereo audio output signal output by the DSP(s) 406 via lines 408*a* and 408*b* of FIG. 4**.

At step 610, the filtered audio signal may be caused to be output to the user. For example, the filtered audio signal may be output to a set of headphones or in-ear monitors that the user has plugged into either the ⅛-inch or ¼-inch output jacks 302/304 on the rear panel 300 of the audio device 100 of FIGS. 1-4. In other examples, the filtered audio signal may be output to the user by other means.

Because over time the human brain will naturally try to compensate for hearing loss on its own, the amount or strength at which the at least the first filter(s) and/or the at least the second filter(s) needs to be applied to the original audio signal to give the user the best perceived amount of hearing compensation may differ from user to user. Accordingly, it may be desirable to provide a user with the ability to indicate an adjustment or change in the strength of the at least the first and/or the at least the second filter applied to the original audio signal, so that the user can "dial-in" the applied strength that provides the user with the best perceived listening experience.

To this end, at step 612, user input associated with the at least the first and the at least the second filters may be received from the user. The user input may be indicative of a change or adjustment in a strength of one or both of the at least the first filter(s) and/or the at least the second filter to be applied to the original audio signal. The user input may be received while the user is listening to the filtered audio signal in real-time, allowing the user to "dial-in" the strength of each filter that achieves the best perceived listening experience. The user input may be received via one or more of the user interface elements of the audio device, such as, for example, any one or more of the buttons, rotary encoders, and knobs 104, 106, 108, 112, 114, 116, 118, 120, 122 and 124 shown in FIGS. 1-2. The display 110 may be used to provide visual feedback to the user about the current strength of the at least the first filter and the at least the second filter being applied to the original audio signal and to indicate the amount of change or adjustment the user is making.

Figure 8:
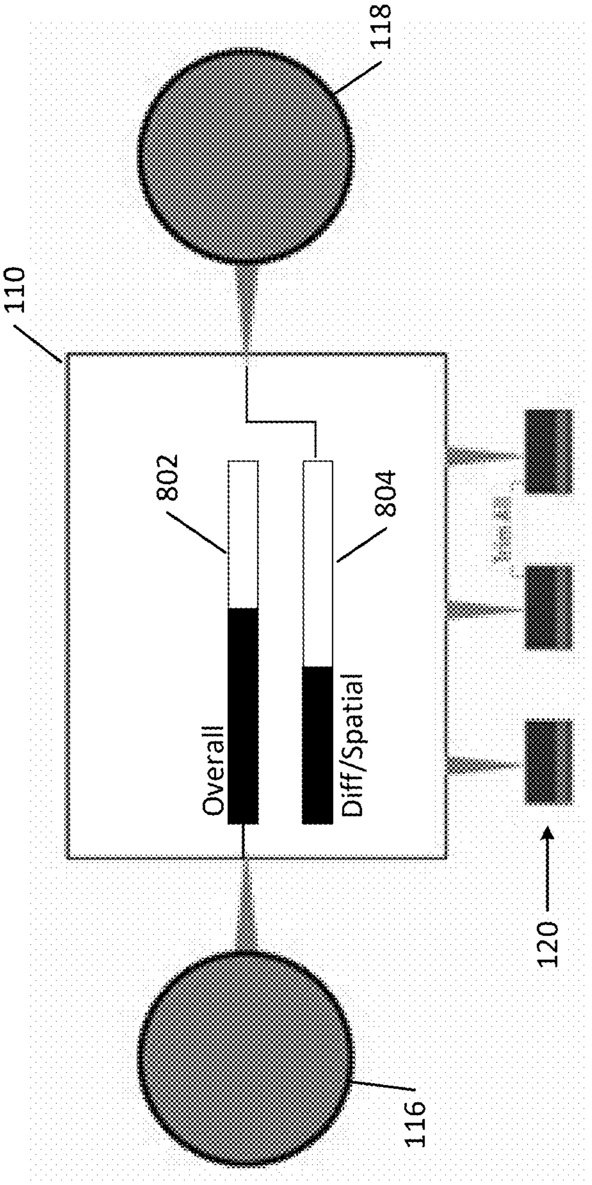
FIG. 8 shows an example user interface.

FIG. 8 shows a portion of the user interface elements of the audio device 100 of FIGS. 1-4 and shows an example user interface that may be used to facilitate a user's adjustment of the strengths of the at least the first filter(s) and/or the at least the second filter(s) applied to the original audio signal to produce the filtered audio signal. As shown, the user interface may comprise respective slider bars 802 and 804 displayed on the display 110 of the audio device 100. The slider bar 802 may be used to visually indicate the strength of the at least the first filter(s) (designated as providing "Overall" compensation) that is applied to the original audio signal. The slider bar 804 may be used to visually indicate the strength of the at least the second filter(s) (designated as providing "Differential" or "Spatial" compensation) that is applied to the original audio signal. A user may adjust the strength of the filters by rotating one or both of the rotary encoders 116 and 118. For example, the user may adjust the strength of the at least the first filter(s) applied to the original audio signal by rotating the rotary encoder 116. The user may adjust the strength of the at least the second filter(s) applied to the original audio signal by rotating the rotary encoder 118. The outputs of the encoders 116 and 118, which indicate any filter strength adjustments desired by the user, may be fed to the DSP(s) 406 of the audio device 100 for use in step 614 of FIG. 6.

Returning to FIG. 6, at step 614, the filtered audio signal output to the user may be adjusted based on the received user input. That is, the strength of the at least the first filter(s) and/or the at least the second filter(s) applied to the original audio signal may be adjusted based on the user input (received, for example, via the rotary encoders 116 and 118), resulting in an adjustment of the filtered audio signal. As indicated by line 616, steps 612 and 614 may be repeated (e.g., in real time) as long as needed for the user to achieve a listening experience most satisfactory to the user. In this manner, the user is able to "dial-in" the strengths of the applied filters that produces the best audio experience for the user.

In some implementations, for some users, at least a third filter may be determined to address more accurately the individual's hearing loss profile. For example, a user may have differential loss as well as midrange loss and high-end loss, where the individual's upper mid-range is more normal. In such a case, the user's hearing profile may exhibit two individual dips, one at the midrange and one at higher frequencies, as well as some differential loss. These three different types of loss may be addressed with different filters (for example, three different filters) and presented to the user with a control for each filter.

In addition, much like an audio engineer crafts and then tweaks filter sets for a given result, artificial intelligence (AI) (e.g., machine learning) may be incorporated to determine an ideal number of filters and their frequency, gain and Q settings to achieve accurate filters to offset both the general (i.e., overall) hearing loss (common to both ears) and the differential hearing loss (difference between ears) of a user, or other types or degrees of hearing loss.

AI may also be used to perform an automated hearing test, for example, built-in to the device 100, that may gather the data necessary to develop the filter parameters to address an individual's hearing loss. In such case, the hearing test may take into account the inaccuracies of the headphones or IEMs or speakers used for the hearing test, further providing the user with an environment approaching ideal hearing. Thus, AI may be utilized to analyze the hearing loss profile of an individual and from that assessment determine the one, two, or more filter sets, and control features of those filter sets, that allow the individual to intuitively dial-in the optimal filter strength for their particular hearing loss, system, and environmental inaccuracies.

Figure 7:
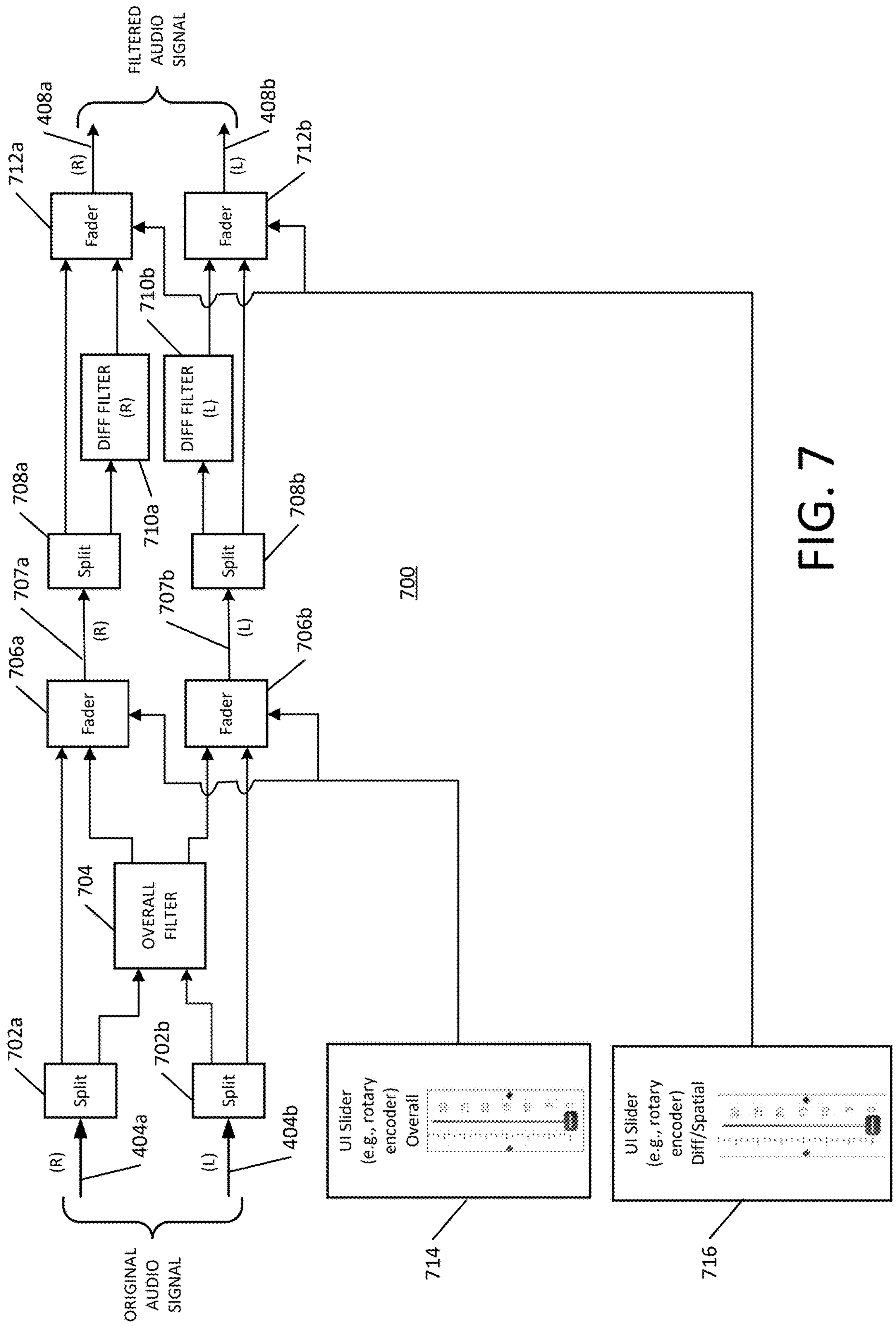
FIG. 7 shows an example digital signal processor (DSP) implementation.

FIG. 7 shows an example digital signal processor (DSP) architecture 700. The DSP architecture 700 may be used to implement at least part of the method of FIG. 6. It is understood that the DSP architecture 700 shown in FIG. 7 is just one example, and other architectures or implementations may be employed.

As shown in FIG. 7, in the example architecture 700, an original stereo audio signal having right (R) and left (L) components may be received on lines 404*a* and 404*b*, respectively. The original stereo audio signal on lines 404*a*/404*b* may, for example, be the original stereo audio signal output by the mixer circuit 402 on the similarly labeled lines 404*a*/404*b* in FIG. 4.

Each of the right (R) and left (L) components of the original audio signal pass via lines 404*a*/404*b* to a respective splitter 702*a*/702*b*, which splits each of the right (R) and left (L) components into two versions of the original audio signal. As further shown, one version of the right (R) and left (L) components of the original audio signal passes directly to a respective pair of cross-fader circuits 706*a* and 706*b*. The other version of the right (R) and left (L) components of the original audio signal passes to the at least the first filter(s) 704, which as discussed above in connection with step 604 of FIG. 6, may be configured to compensate for an overall hearing loss, common to both the left and right ears of the user, as indicated by the hearing information of the user. As discussed above in connection with FIG. 6, the at least the first filter(s) 704 may be determined by program code executing on the one or more processors 414 and/or the one or more DSPs 406 of the audio device 100, and the determined first filter(s) 704 may be different for different users, based on the individual hearing information of each user, and, in the case of an in-device automated hearing test, also based on the inaccuracies of the user's listening device and environment.

As further discussed above in connection with step 604 of FIG. 6, the at least the first filter(s) 704 may comprise a first plurality of filters, each having a center frequency corresponding to one of the plurality of frequencies for which hearing loss values are provided in the hearing information of the user. Each of the first plurality of filters may have a determined center frequency, gain and bandwidth (e.g., Q) calculated such that together, the frequency response of the first plurality of filters across the range of frequencies may approximate the inverse of the hearing loss curve (e.g., curve 502 or 504 in FIG. 5A) of the ear determined to exhibit the least hearing loss across the range of frequencies of the hearing loss profile. When applied to an original audio signal, the first plurality of filters may be applied to both the left (L) and right (R) audio signal components of the original audio signal. Together, the first plurality of filters may form a multi-band stereo parametric equalization (EQ) filter, where each band of the parametric EQ filter is associated with a different one of the plurality of frequencies for which hearing loss values are provided in the hearing information.

The right (R) and left (L) outputs of the overall filter 704 are then fed to respective second inputs of the pair of cross-fader circuits 706*a* and 706*b*. Thus, the pair of cross-faders 706*a* and 706*b* each receive both the unfiltered original stereo audio signal and a filtered version of the original audio signal to which the overall filter 704 has been applied. The pair of cross-faders 706*a*/706*b* are configured to blend the unfiltered original audio signal and the filtered version of the original audio signal to which the overall filter 704 has been applied. The amount of blending performed by the cross-faders 706*a*/706*b* is controlled by user input received via a user interface "slider" element 714. As one example, the user interface slider element 714 may comprise the rotary encoder 116 of the example audio device 100 shown in FIGS. 1, 2 and 8. Thus, using the rotary encoder 116 a user is able to control the amount of blending, by the cross-faders 706*a*/706*b*, of the unfiltered original stereo audio signal and the filtered version of the original audio signal to which the overall filter 704 has been applied. In this manner, the user effectively is able to control the strength of the overall filter 704 applied to the original audio signal. This form of user control of the "overall" hearing correction provided by the overall filter 704 may be referred to hereinafter as control of "overall EQ correction."

The output of the cross-faders 706*a* and 706*b* on lines 707*a* and 707*b*, respectively, thus represents an intermediate filtered audio signal comprising a filtered version of the original audio signal to which a user-controlled amount (i.e., strength) of the at least the first filter ("overall filter") 704 has been applied.

As further shown, the right (R) and left (L) components of the intermediate filtered audio signal on lines 707*a* and 707*b*, respectively, are passed to another pair of splitters 708*a* and 708*b*, respectively. After splitting the signal, one version of the intermediate filtered audio signal is output from the splitters 708*a*/708*b* and passed directly to another pair of cross-faders 712*a*/712*b*. Each of the right (R) and left (L) components of the other version of the intermediate filtered audio signal is passed from the splitters 708*a*/708*b* to an input of a respective component of the at least the second filter(s) 710*a*/710*b* ("diff filter"), which as discussed above in connection with step 606 of FIG. 6 may be configured to compensate for a difference in hearing loss, between the left and right ears of the user, as indicated by the hearing information. Recall from above that differential hearing loss (sometimes also referred to as spatial loss), where the left and right ears of a user exhibit different losses at different frequencies, causes stereo audio information to be skewed in its spatial presentation. As further discussed above in connection with FIG. 6, the at least the second filter(s) 710*a*710*b* may be determined by program code executing on the one or more processors 414 and/or the one or more DSPs 406 of the audio device 100, and the determined second filter 710*a*/710*b* may be different for different users, based on the individual hearing information of each user, and, in the case of an in-device automated hearing test, also based on the inaccuracies of the user's listening device and environment.

As further discussed above in connection with step 606 of FIG. 6, the at least the second audio filter(s) 710*a*/710*b* ("diff filter") may comprise a second plurality of filters, each having a center frequency corresponding to one of the plurality of frequencies for which hearing loss values are provided in the hearing information of the user. Each of the second plurality of filters may have a determined center frequency, gain and bandwidth (e.g., Q) calculated such that together, the frequency response of the second plurality of filters across the range of frequencies may approximate the inverse of the difference between the hearing loss curves (e.g., curve 502 and 504 in FIG. 5A) of the left and right ears.

As still further discussed above in connection with step 606 of FIG. 6, in one example implementation, the second plurality of filters 710*a*/710*b* may be applied only to the one of the left (L) or right (R) components of the intermediate filtered audio signal corresponding to the ear (left or right) that exhibits the most hearing loss across the range of frequencies. Thus, as shown in FIG. 7, one of the components (R) or (L) of the second plurality of filters 710*a*/710*b* may have their gain values set to zero, such that the second plurality of filters is only applied to the one of the left (L) or right (R) components of the intermediate filtered audio signal corresponding to the ear (left or right) that exhibits the most hearing loss across the range of frequencies. In this respect, together, the second plurality of filters 710*a*/710*b* may form a multi-band mono parametric equalization (EQ) filter.

It should be noted that in other implementations, instead of zeroing the gain values of one of the right (R) or left (L) components of the second plurality of filters 710*a*/710*b* so that the filtering is only applied to the signal reaching one ear of the user, one component of the second plurality of filters could instead have a negative gain value, while the other component has a lower positive value such that together they still compensate for the full difference between the hearing loss in the left and right ears of the user—but that compensation is spread across the signals reaching both ears.

As further shown in FIG. 7, the right (R) and left (L) outputs of the at least the second filter ("diff filter") 710*a*/710*b* are then fed to respective second inputs of the pair of cross-fader circuits 712*a* and 712*b*. Thus, the pair of cross-faders 712*a* and 712*b* each receive both the intermediate filtered stereo audio signal as was output on lines 707*a*/707*b* and a version of the intermediate filtered stereo audio signal to which the at least the second ("diff filter") 710*a*/710*b* has been applied. The pair of cross-faders 712*a*/712*b* are configured to blend the intermediate filtered audio signal and the version of that intermediate filtered audio signal to which the "diff filter" 710*a*/710*b* has been applied. The amount of blending performed by the cross-faders 712*a*/712*b* is controlled by user input received via a user interface "slider" element 716. As one example, the user interface slider element 716 may comprise the rotary encoder 118 of the example audio device 100 shown in FIGS. 1, 2 and 8. Thus, using the rotary encoder 118 a user is able to control the amount of blending, by the cross-faders 712*a*/712*b*, of the intermediate filtered stereo audio signal and the version of the intermediate filtered audio signal to which the diff filter 710*a*/710*b* has been applied. In this manner, the user effectively is able to control the strength of the diff filter 710*a*/710*b* applied to the original audio signal. This form of user control of the "differential" hearing correction provided by the diff filter 710*a*/710*b* may be referred to hereinafter as control of "differential EQ correction."

The output of the cross-faders 712*a* and 712*b* on lines 408*a* and 408*b*, respectively, thus represents a filtered audio signal comprising a filtered version of the original audio signal to which user-controlled amounts (i.e., strengths) of both the at least the first filter ("overall filter") 704 and the at least the second filter ("diff filter") 710*a*/710*b* have effectively been applied. As shown, for example, in FIG. 4, the right (R) and left (L) components of the filtered stereo audio signal on lines 408*a* and 408*b* may be amplified by one or more amplifier circuits 410 and ultimately sent to the audio output connectors of the audio device 100, such as, for example, the ¼-inch and ⅛ inch output connectors 302 and 304 on the rear panel 300 of the audio device 100. A user is able to listen to the filtered audio signal using headphones or in-ear monitors plugged into the one of those output connectors. As further mentioned, a mono version of the filtered audio output signal may be output via the XLR connector 306 on the rear panel 300.

Figure 9:
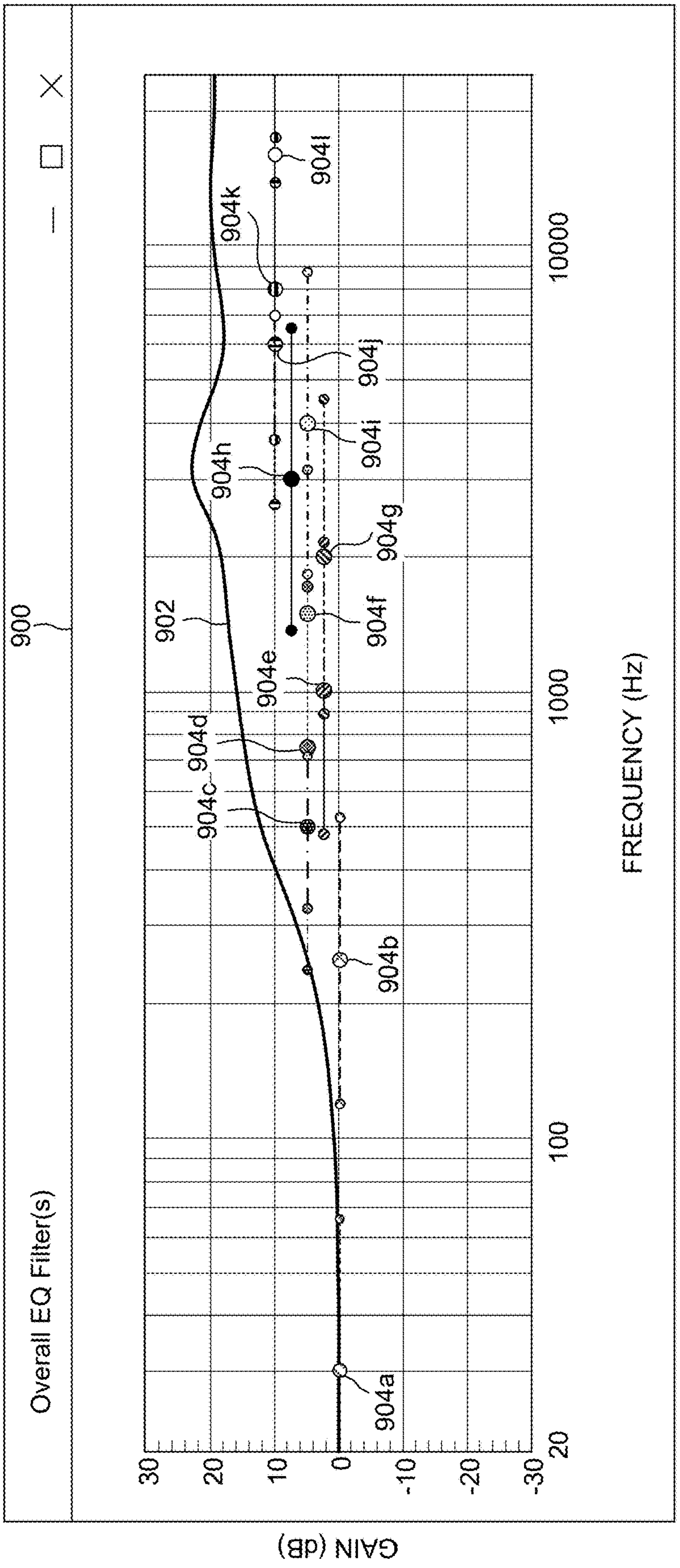
FIG. 9 shows a frequency response of an example first filter(s)

FIG. 9 shows a frequency response 900 of an example the at least the first filter(s), i.e., first plurality of filters, that may be determined (e.g., calculated, generated, or otherwise automatically determined) by the one or more processors 414 or DSPs 406 based on the example hearing information of FIG. 5A. The frequency response across the full range of frequencies is shown by the curve 902. The frequency response 902 of the first plurality of filters shown in FIG. 9A may compensate for an overall (i.e., general) hearing loss, common to both the left and right ears of the user, as indicated by the hearing information. As described above, because hearing profiles of different users are likely to vary widely, the first plurality of filters determined for one user, may be different than the plurality of filters determined for another user. The first plurality of filters shown in FIG. 9 may be those implemented by the overall filter block 704 of FIG. 7.

The center frequency and bandwidth (i.e., Q) of each of the first plurality of filters is shown, respectively, at 904*a*, 904*b* . . . 904*l*. Some filters of the plurality of filters (904*a*, 904*b* . . . 904*l*) may have a center frequency corresponding to one of the plurality of frequencies for which hearing loss values are provided in the hearing information. However, in order for the frequency response 902 to cover the full range of audible frequencies (20 Hz to 20 kHz), some of the plurality of filters 904*a*, 904*b* . . . 9041 may have center frequencies above or below those indicated in the hearing information, which center frequencies may be determined by extrapolation from the hearing information. Again, the center frequencies and bandwidths of the plurality of filters may be calculated, generated, or otherwise automatically determined such that together they cover the full range of frequencies audible to humans (e.g., 20 Hz to 20 kHz) (even though the hearing information provided by the user may only cover frequencies in the range of 250 Hz to 8 kHz).

As can be seen in FIG. 9, the frequency response 902 over the full range of frequencies (e.g., 20 Hz to 20 kHz) may approximate the inverse of the hearing loss curve (e.g., curve 502) of the ear determined to exhibit the least hearing loss in the hearing loss information of FIG. 5A. When applied to an original audio signal, the first plurality of filters may be applied to both the left (L) and right (R) audio signal components of the original audio signal. Together, the first plurality of filters may form a multi-band stereo parametric equalization (EQ) filter, where the majority of bands of the parametric EQ filter are associated with a different one of the plurality of frequencies for which hearing loss values are provided in the hearing information.

Figure 10:
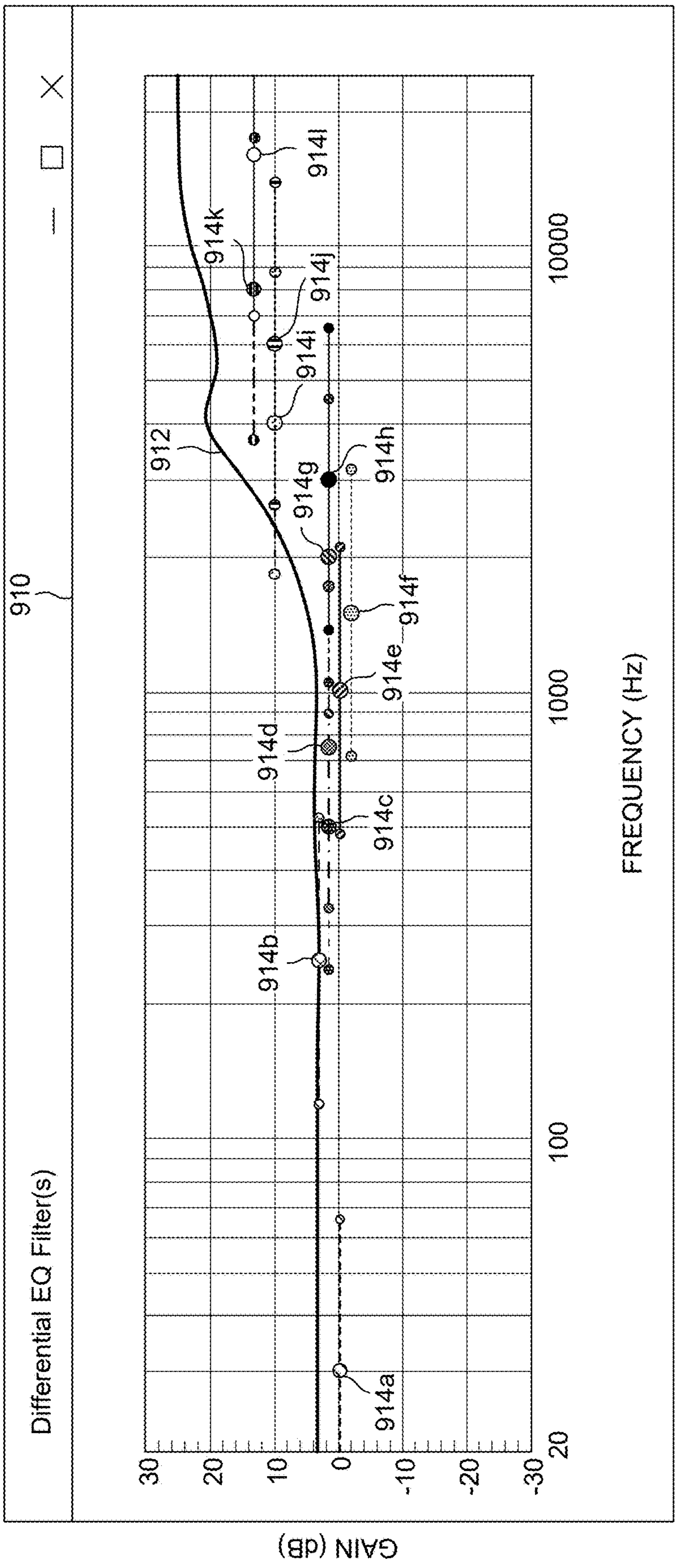
FIG. 10 shows a frequency response of an example second filter(s)

FIG. 10 shows a frequency response 910 of an example of the at least the second filter(s), i.e., second plurality of filters that may, for example, be determined (e.g., calculated, generated, or otherwise automatically determined) by the one or more processors 414 or DSPs 406 based on the example hearing information of FIG. 5A. The frequency response across the full range of frequencies is shown by the curve 912. The frequency response 912 of the first plurality of filters shown in FIG. 10 may compensate for a difference in hearing loss, between the left and right ears of the user, as indicated by the hearing information. Again, the second plurality of filters determined for one user, may be different than the second plurality of filters determined for another user. The second plurality of filters shown in FIG. 9B may be those implemented by one of the differential filter blocks 710*a* or 710*b* of FIG. 7.

The center frequency and bandwidth (i.e., Q) of each of the first plurality of filters is shown, respectively, at 914*a*, 914*b* . . . 914*l*. Some filters of the plurality of filters (914*a*, 914*b* . . . 914*l*) may have a center frequency corresponding to one of the plurality of frequencies for which hearing loss values are provided in the hearing information. However, in order for the frequency response 912 to cover the full range of audible frequencies (20 Hz to 20 kHz), some of the plurality of filters 914*a*, 914*b* . . . 9141 may have center frequencies above or below those indicated in the hearing information, which center frequencies may be determined by extrapolation from the hearing information. Again, the center frequencies and bandwidths of the plurality of filters may be calculated, generated, or otherwise automatically determined such that together they cover the full range of frequencies audible to humans (e.g., 20 Hz to 20 kHz) (even though the hearing information provided by the user may only cover frequencies in the range of 250 Hz to 8 kHz).

As can be seen in FIG. 10, the frequency response 912 over the full range of frequencies (e.g., 20 Hz to 20 kHz) may approximate the inverse of the difference between the hearing loss curves (e.g., curves 502 and 504 in FIG. 5A) of the left and right ears, as indicated by the hearing information. When applied to an original audio signal, the second plurality of filters may be applied to the one of the left (L) or right (R) audio signal components of the original audio signal corresponding to the ear of the user that exhibits the worst hearing loss (e.g., the right ear as indicated by the loss curve 504 in FIG. 5A). Together, the second plurality of filters may form a multi-band mono parametric equalization (EQ) filter, where the majority of bands of the parametric EQ filter are associated with a different one of the plurality of frequencies for which hearing loss values are provided in the hearing information—the others being added to enable the plurality of filters to cover the full spectrum of audible frequencies (e.g., 20 Hz to 20 kHz).

Described so far in connection with FIGS. 6, 7, 8, 9, and 10 are two forms of user control—control of overall EQ correction and control of differential EQ correction. Additional forms of user control may also be provided, either separately or in combination with the control of overall EQ correction and/or differential EQ correction.

For example, the methods, apparatus and systems described herein may further provide a user with the ability to control dynamics associated with the audio output to the user by the audio device. For example, the user may be provided with the ability to control compression, multi-band compression, limiting (hard and soft), and/or gating. Control of yet other types of audio dynamics may also be provided. Collectively, control of one or more of compression, multi-band compression, limiting, and/or gating may be referred to herein as "control of dynamics" or simply "dynamics control."

Compression is an audio signal processing technique used to control the dynamic range of audio signals—that is, the difference between the loudest and quietest parts of an audio signal (e.g., audio performance). At least one benefit of using compression in the signal chain of an audio device, such as the audio device (e.g., personal mixer) illustrated and described herein in connection with FIGS. 1-4, 7 and 8, is that compression may help prevent damage to a user's hearing, damage to audio listening devices, such as IEMs, headphone, or speaker, and may also prevent distortion and digital and analog circuit clipping.

For example, compression can keep levels in a safe range for both the listener and the electronics. When equalization (EQ) is applied to compensate for hearing loss, as discussed above, the amplification can get aggressive in certain frequency bands where the user's hearing is compromised. There is a limit to how loud the physical system can amplify bands where the user is asking for significant correction via, for example, the overall EQ and differential EQ controls shown in FIG. 8 and discussed above. Multiband compression, where the compression algorithm is applied to primarily the frequencies that are most amplified (i.e., have the most hearing loss for which to compensate), can be an effective safeguard against signal clipping within the DSP, clipping in any of the analog circuitry, and distortion or damage to the transducers producing the output sounds for the user (e.g. IEMs, headphones, or speakers). Such protection for the electronics also provides protection for the user's hearing. That is, protection from excessive, content-dependent peaks in the output volume. By giving a user the ability to control compression of the audio signal output to the user, in addition to control of overall EQ and differential EQ, the user is provided with excellent hearing loss compensation, while at the same time providing a safety net against excessively loud peaks. This may help to provide very smooth, correct sound for the user.

Another benefit that compression may provide is to raise the volume (i.e., level) of soft sounds. This effect may be useful in adding clarity to the frequencies in which the user has hearing loss.

A number of parameters may be adjusted in connection with controlling compression of an audio signal. These parameters may include:

threshold—sets the level where compression starts;

ratio—controls how much the signal is reduced above the threshold;

attack—sets how quickly compression starts;

release—sets how quickly compression stops;

knee—smooths or sharpens how compression begins near the threshold; and makeup gain—boosts the compressed signal to restore lost volume.

In terms of providing a user of an audio device (such as the audio device (e.g., personal mixer) illustrated in FIGS. 1-4, 7 and 8 and described herein) with the ability to control compression of an audio signal in connection with hearing loss compensation, the user may be provided with the ability to control any one or more of these parameters associated with audio signal compression. In some implementations, in order to simplify operation for the user, the number of compression parameters that a user is able to control may be limited. For example, the user may be limited to controlling only the compression threshold (level where compression starts). In other implementations, in addition to compression threshold, the user may be able to control additional (or all) compression parameters listed above, including one or more of ratio, attack, release, knee, or makeup gain.

Multi-band compression involves applying precise control of compression over different frequency ranges. Additional parameters that may be controlled for multi-band compression may include:

- crossover frequency—sets the dividing points between frequency bands;
- per—band threshold-sets a separate threshold for each frequency band;
- per—band ratio—controls compression amount per band;
- per-band attack/release—adjusts attack/release times for each band; and
- per—band gain-boosts or cuts output level of individual bands after compression.

Again, in terms of providing a user of an audio device (such as the audio device (e.g., personal mixer) illustrated in FIGS. 1-4, 7 and 8 and described herein) with the ability to control multi-band compression of an audio signal in connection with hearing loss compensation, the user may be provided with the ability to control any one or more of these parameters associated with multi-band compression. In some implementations, in order to simplify operation for the user, the number of multi-band compression parameters that a user is able to control may be limited. For example, the user may be limited to controlling only the per-band compression threshold (level where compression starts in each band). In other implementations, the user may be able to control additional (or all) of the multi-band compression parameters listed above.

Limiting is an audio processing technique that caps the maximum level of an audio signal. When a signal tries to go above a specified threshold, the limiter reduces the gain to keep it below that level. It is used in audio processing to prevent audio signals from exceeding a certain level, usually to avoid distortion or clipping and/or to protect the listener from excessive volume. By giving a user the added ability to control limiting of an audio signal, the user can achieve excellent hearing loss compensation while providing a hard and fast safety net (i.e., limit) against excessively loud peaks that could cause circuit distortion or hearing damage.

A number of parameters may be adjusted in connection with controlling limiting of an audio signal. These parameters may include:

- threshold—sets the maximum allowed output level;
- ceiling (output limit)—caps the absolute highest level the signal can reach (often set just below 0 dB in digital systems);
- attack—controls how quickly the limiter reacts to a signal exceeding the threshold;
- release—determines how quickly the limiter stops reducing gain after the signal drops below the threshold;
- lookahead—lets the limiter "preview" the signal slightly ahead of time for more accurate peak control in digital audio systems; and
- input gain (pre—gain)—boosts the incoming signal before limiting occurs, used to increase perceived loudness.

As with control of compression and/or multi-band compression, in terms of providing a user of an audio device (such as the audio device (e.g., personal mixer) illustrated in FIGS. 1-4, 7 and 8 and described herein) with the ability to control limiting of an audio signal in connection with hearing loss compensation, the user may be provided with the ability to control any one or more of these parameters associated with audio signal limiting. In some implementations, in order to simplify operation for the user, the number of audio limiting parameters that a user is able to control may be limited. For example, the user may be limited to controlling only the limiting threshold (maximum allowed output level). In other implementations, in addition to limiting threshold, the user may be able to control additional (or all) audio signal limiting parameters listed above.

Audio signal gating is used to reduce or eliminate unwanted sounds (like background noise, hiss, or mic bleed) by muting audio signals that fall below a certain volume threshold. Due to the excessive overall and differential EQ filtering that may be needed to address users with certain hearing loss profiles, background noise may be elevated to a high audio level. Applying an audio gate may keep the output quiet until an audio signal is present. A number of parameters may be adjusted in connection with controlling gating of an audio signal. These parameters may include:

- threshold—the volume level that determines when the gate opens or closes;
- attack time—how quickly the gate opens when the signal exceeds the threshold;
- release time—how quickly the gate closes after the signal falls below the threshold; and
- hold time—how long the gate stays open after the signal falls below the threshold.

As with control of compression, multi-band compression, and/or limiting, in terms of providing a user of an audio device (such as the audio device (e.g., personal mixer) illustrated in FIGS. 1-4, 7 and 8 and described herein) with the ability to control gating of an audio signal in connection with hearing loss compensation, the user may be provided with the ability to control any one or more of these parameters associated with audio signal gating. In some implementations, in order to simplify operation for the user, the number of audio gating parameters that a user is able to control may be limited. For example, the user may be limited to controlling only the gating threshold (volume level that determines when the gate opens or closes). In other implementations, in addition to gating threshold, the user may be able to control additional (or all) audio signal gating parameters listed above.

Figure 11:
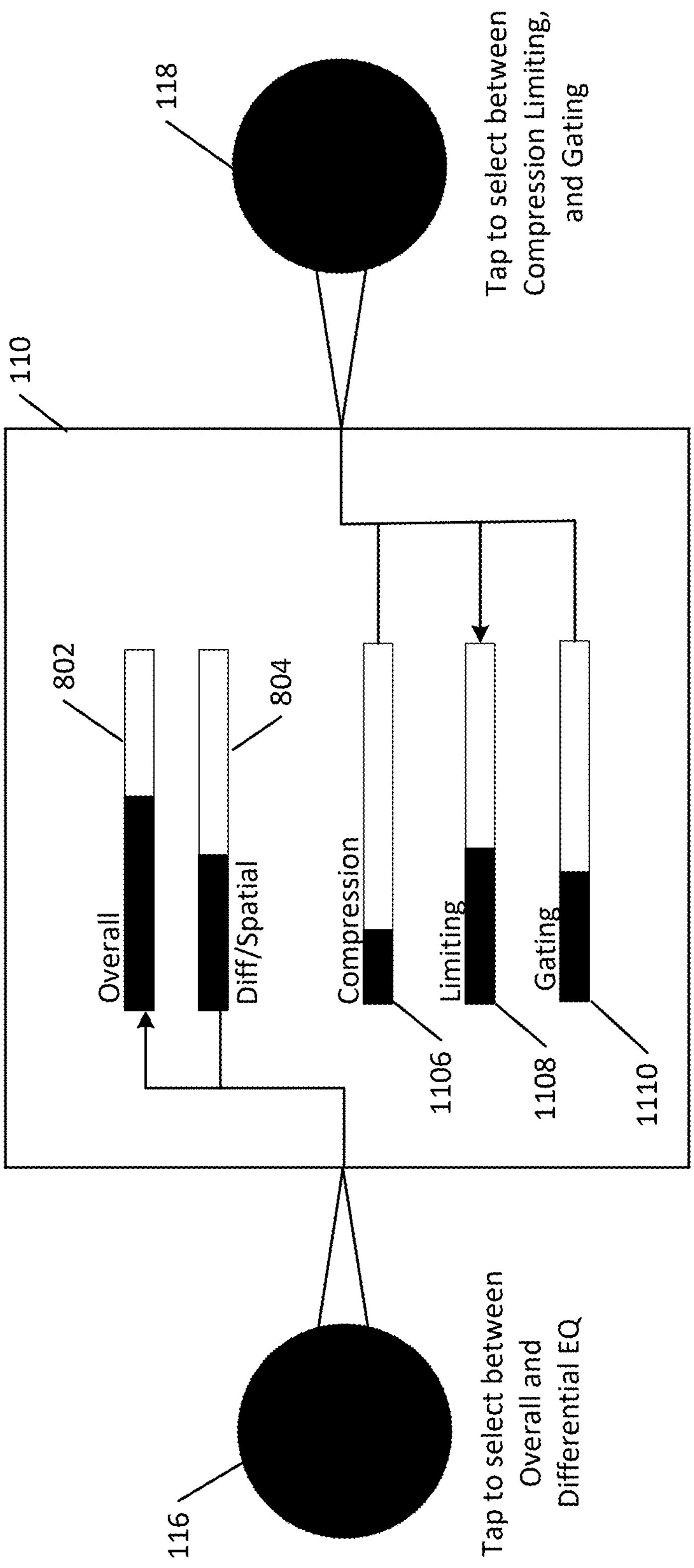
FIG. 11 shows another example user interface.

FIG. 11 shows a modification of the example user interface of FIG. 8, which may be used to facilitate a user's control of compression, limiting, and gating, in addition to the control of overall EQ and differential EQ. As shown, the user interface may comprise additional slider bars 1106, 1108, and 1110 to visually indicate the amount of compression, limiting, and gating, respectively, that may be applied to the filtered audio signal output to the user. In this example, a user may tap the rotary encoder 116 to switch between controlling overall EQ and controlling differential EQ (by rotation of the encoder 116). In this example, as indicated by the arrow, the user has tapped the rotary encoder to show that rotation of the encoder 116 will control the amount (i.e., strength) of overall EQ applied to the audio signal. If the user again taps the encoder 116, the arrow will switch to pointing to slider 804 to indicate that rotation of the encoder would control the amount (i.e., strength) of differential EQ applied to the audio signal.

Similarly, in this example, the user may tap the rotary encoder 118 to switch between controlling compression, limiting, or gating (again by rotating the rotary encoder 118). In the example shown, the arrow is pointing to slider 1108, indicating to the user that rotation of the encoder 118 will control the limiting applied to the audio signal. The user may tap encoder 118 to cause the arrow to switch to the next slider, e.g., slider 1110, to indicate that rotation of the encoder 118 would control the gating applied to the audio signal. Another tap would cause the arrow to point to slider 1106 to indicate that rotation of the encoder 118 would control the compression applied to the audio signal, and so on.

As mentioned above, to simplify the control of compression, limiting, and/or gating by the user, the user may only be able to control a single parameter associated with the selected audio processing function (i.e., compression, limiting, or gating). For example, when compression is selected for control, rotation of the encoder 118 may only control the compression threshold parameter associated with any applied compression of the audio signal. Similarly, when limiting is selected for control, rotation of the encoder 118 may only control the limiting threshold parameter associated with any applied limiting of the audio signal. And similarly, when gating is selected for control, rotation of the encoder 118 may only control the gating threshold parameter associated with any applied gating. The outputs of the encoders 116 and 118 may be fed to the DSP(s) 406 of the audio device 100 for use in step 614 of FIG. 6.

Figure 12:
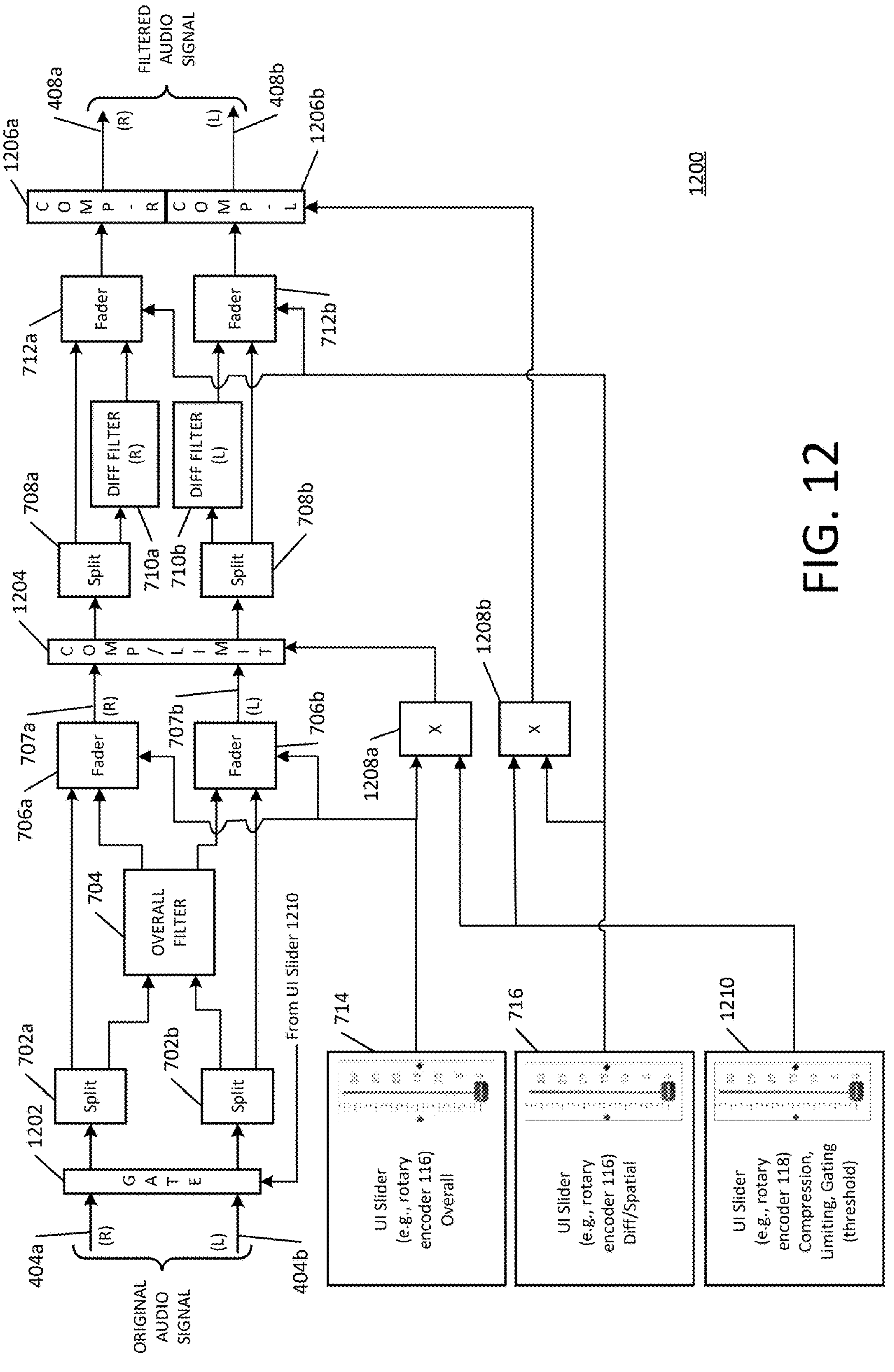
FIG. 12 shows another example DSP implementation.

FIG. 12 shows another example digital signal processor (DSP) architecture 1200. In particular, FIG. 12 shows an example of how control of compression, limiting, and gating may be added to the architecture of FIG. 7. It is understood that the DSP architecture 1200 shown in FIG. 12 is just one example, and other architectures or implementations may be employed.

As shown in FIG. 12, in the example implementation shown, a gating function may be applied to the left and right audio signals 404*a*, 404*b* using gating circuitry 1202. As discussed above in connection with the example user interface of FIG. 11, a user may be provided with the ability to control parameter(s) of the gating, such as the gating threshold parameter, by rotation of the rotary encoder 118. In other implementations, the user may be provided with the ability to control additional or other parameters of the gating provided by gating circuit 1202. The output of the rotary encoder 118 may be fed to the gating circuitry 1202 to control the gating threshold parameter or other parameters. One potential benefit of applying gating to the left and right audio signals 404*a*, 404*b* is that the gating may prevent the downstream filters (e.g., filters 704 and 710*a-b*) from amplifying unwanted background noise.

As further shown in FIG. 12, compression and/or limiting may be applied to the filtered signals by compression and limiting circuitry 1204 and 1206*a-b*. In the case of compression and limiting circuitry 1206*a* and 1206*b*, the compression and limiting may be provided separately (i.e., mono control) to the right and left filtered signals 408*a*, 408*b* by the respective compression and limiting circuits 1206*a* and 1206*b*. Alternatively, or in addition, compression and limiting of the filtered signals 408*a*, 408*b* may be applied equally or in varying rations to both the right and left signals using both compression and limiting circuits 1206*a* and 1206*b*.

Where in the signal chain to provide compression and limiting (e.g., via compression/limiting circuitry 1204 and/or compression/limiting circuitry 1206*a-b*) may be based on the filters 704 and 710*a-b* determined for a particular user (i.e., determined based on the user's hearing information (e.g., audiogram)). For example, when a user exhibits differential hearing loss at one or more frequencies (per the user's hearing information), multiband-compression and limiting may be added, via the compression/limiting circuitry 1204, after the overall filter 704 to keep the amplified frequencies from being harsh (compression) or distorting the circuitry (compression+limiting). Then additional multi-band-compression and limiting may be added after the differential filter(s) 710*a-b* again to keep the amplified frequencies from being harsh (compression) or distorting the circuitry (compression+limiting). This additional compression/limiting may be left-right controlled independently, using the individual compression/limiting circuits 1206*a*, 1206*b* to address the different EQ filters 710*a*, 710*b* in the right and left signal paths.

As another example, consider a user hearing profile that exhibits significant loss in both ears at the mid-range frequencies of the hearing profile, but less loss at higher frequencies and then perhaps additional loss in the ultra-high frequencies (sometimes referred to herein as a "mid-range dip" profile or a "notch" profile) (e.g., as shown for example in FIG. 5C). For such a hearing profile, multiband-compression and limiting may be added, via the compression/limiting circuitry 1204, after the overall filter 704 (which may address the general loss frequencies but not the dip frequency loss) to keep the amplified frequencies from being harsh (compression) or distorting the circuitry (compression+limiting). Then additional stereo multiband-compression and limiting may be added, using both the compression/limiting circuits 1206*a*, 1206*b*, after the differential filters 710*a*, 710*b* (which may be used as a stereo-pair EQ to provide a secondary EQ filter and control to directly address the dip frequencies) to keep the amplified frequencies from being harsh (compression) or distorting the circuitry (compression+limiting). Using both compression/limiting circuits 1206*a* and 1206*b* would provide stereo (as opposed to mono) compression and/or limiting of the right and left filtered output signals 408*a*, 408*b*.

As further shown in FIG. 12, one or more parameters of the compression, one or more parameters of the limiting, and/or one or more parameters of the gating provided by the gating circuitry 1202 and compression/limiting circuitry 1204, 1206*a-b* may be controlled by user input received via a user interface "slider" element 1210. As one example, the user interface slider element 1210 may comprise the rotary encoder 118 of the example audio device 100 shown in FIGS. 1, 2 and 11. For example, as discussed above, the user may "tap" the rotary encoder 118 to select which form of dynamics (compression, limiting, or gating) the user wishes to control, and they by rotating the encoder 118, the user may control one or more parameters of the selected dynamic (compression, limiting, or gating). As mentioned above in connection with the discussion of FIG. 11, in one implementation, to simplify operation by a user, the user may only be provided with the ability to control one parameter of each of the compression, limiting, and gating functions. For example, when a user has selected to control compression, use of the rotary encoder 118 may provide the ability for the user to control only the compression threshold parameter. When a user has selected to control limiting, use of the rotary encoder 118 may provide the ability for the user to control only the limiting threshold parameter. Similarly, when a user has selected to control gating, use of the rotary encoder 118 may provide the ability for the user to control only the gating threshold parameter. In other implementations, in which users are perhaps more skilled at audio production or processing, the user may be provided with the ability to control additional (or all) of the parameters associated with compression, limiting, and gating.

As further shown in FIG. 12, particularly with respect to compression and limiting, the optimum threshold for the compression or limiting may be dependent on the amount (i.e., strength) of the overall EQ filter 704 and/or differential EQ filters 710*a-b* that a user has applied to the filtered audio signal using UI sliders 714 and 716. Because of this dependence, multiplier circuits 1208*a* and 1208*b* may be provided such that, rather than allowing the user to control the compression, limiting, and/or gating thresholds directly, the user is able to control those thresholds as a ratio of the amount (i.e., strength) of the overall EQ filter 704 and differential EQ filters 710*a-b* has set using the UI sliders 714 and 716. For example, the output of the UI slider 1210 may be fed to one input of the multiplier circuitry 1208*a*, and the output of the UI slider 714 (used to control the strength of the overall EQ filter 704) may be fed to the other input of the multiplier circuit 1208*a*. The output of the multiplier circuit 1208*a* may then be fed to the compression/limiting circuit 1204 to control the threshold parameters of those compression/limiting functions. Similarly, the output of the UI slider 1210 may be provided to one input of the multiplier circuit 1208*b*, and the output of the UI slider 716 (used to control the strength of the differential EQ filters 710*a-b*) may be fed to the other input of the multiplier circuit 1208*b*. The output of the multiplier circuit 1208*b* may then be fed to the compression/limiting circuits 1206*a-b* to control the threshold parameters of those compression/limiting functions. In other words, compression and limiting may be controlled based on the EQ filter design with controls that are relational to the user's control of overall and/or differential EQ, thereby presenting the user a simplified, intuitive control suite custom designed based on their hearing profile.

Using multipliers 1208*a* and 1208*b* is one method for developing a relationship between the strength of the compression and the strength of the applied overall or differential EQ with the goal of providing the user with simplified intuitive controls. Other methods may be utilized for maintaining a relationship between control of overall and/or differential EQ and control of compression, such as a more sophisticated approach that incorporates a higher-order relationship than a simple multiplier, or a simple table lookup.

Another form of user control may also be provided to help a user whose hearing information indicates a "mid-range dip" hearing profile, i.e., significant hearing loss in mid-range frequencies but less loss at higher frequencies (e.g., as shown for example in FIG. 5C). This form of user control may be useful with any profile in which there are one or more distinct frequency ranges of symmetrical hearing loss. This form of user control may be referred to herein as "secondary EQ." Such secondary EQ control may enable a user to apply a secondary form of stereo parametric EQ in the mid-range frequency(ies) for which the user is exhibiting the mid-range hearing loss (dip(s)). In one implementation, with reference to FIGS. 7 and 12, the secondary EQ control may be implemented by operating the right and left differential filters 710*a*, 710*b* together as a secondary stereo EQ in the range of frequencies for which the user is experiencing the dip (loss) in hearing. In the case in which the user is experiencing more than one mid-range dip (i.e., dips in two or more different mid-range frequency bands), the control of the secondary EQ filtering may be provided separately for each frequency range/band experiencing the dip (loss) in hearing. As with the overall EQ and differential EQ controls discussed above, a user may control the strength of this secondary (stereo) EQ filtering using one of the rotary encoders of the audio device, such as the rotary encoder 116. Thus, for the midrange-dip hearing loss profile, and for other profiles where there are one (or more) distinct frequency ranges of symmetrical hearing loss, the user may benefit from both control of overall EQ (as discussed above) and this secondary EQ control (but maybe not the differential EQ discussed above). In other words, for a user whose hearing loss is primarily symmetrical, but exhibits one or more mid-range dips, it may not make sense to provide any differential EQ control. Rather, in addition to the overall EQ provided as discussed above, the user may be provided with control of one or more secondary EQ filters (which may be implemented by combining the right and left differential filters 710*a*, 710*b* together to form a single, stereo EQ filter) applied in the ranges of frequencies exhibiting the more pronounced hearing dip.

Another form of user control may be provided to help a user address potential cochlear dead region(s) indicated by the user's hearing information. When a user's hearing information shows a hearing loss of 90 dB or greater at a particular frequency or range of frequencies, it is indicative of a possible "cochlear dead region" at that frequency or frequency range. A cochlear dead region is a specific area within the inner ear that has significantly impaired hearing sensitivity, resulting in a frequency range that cannot be accurately detected, even if the sound is presented at high volume. To make matters worse, if the sound is loud enough, other areas within the inner ear that are near the dead region may respond, resulting in distortion. FIG. 5E shows an example of hearing information (i.e., audiogram) for a user exhibiting a potential cochlear dead region between 6 kHz and 10 kHz. As shown, the hearing loss in this range is 90 dB or greater.

In one implementation, when a user's hearing information indicates a loss of 90 dB or greater at a particular frequency, the overall EQ filter 704 and differential EQ filters 710*a-b* may be generated such that no compensation is provided at the frequencies associated with that potential cochlear dead region. Alternatively, or in addition, a user who exhibits a potential cochlear dead region may be provided with the ability to control whether to enable or disable signal amplification (i.e., hearing compensation) at the indicated frequencies of the dead region. For example, for the example hearing information of a user shown in FIG. 5E, the user control provided may enable the overall and differential EQ levels in the 6 kHz to 10 kHz region to be adjusted between 0 and 100%. In other words, no user adjustment would result in 100% of the applied EQ based on the user's hearing information, but the user may "duck the region down" to 0% as desired. It may also provide the user with control(s) of frequencies adjacent to the dead region as well. Such a user control may be referred to as "dead region ducking."

In other implementations, the dead region ducking control may have multiple adjustment options. For example, a first adjustment may enable the user to control parametric EQ in the range of frequencies of the dead region. For example, if the user's dead region is in the 6 kHz to 10 kHz range, the user's dead region ducking control would cause the 6 kHz, 8 kHz, and 10 kHz EQ values to change. A second adjustment may give the user control of the parametric EQ of regions adjacent to the dead region. For example, using the same example dead region at 6 kHz to 10 kHz, this second adjustment may enable the user to control parametric EQ in the adjacent 4 kHz and 12 kHz bands. In such case, each adjacent frequency may have its own user control, or just one user control may be used to affect both adjacent bands.

Yet another form of user control may be provided to help users exhibiting profound unilateral hearing loss (useable hearing in only one ear). In one implementation, a user may be able to control the degree to which the left and right audio signals may be mixed into a mono audio signal and output to the user's useable ear. For example, the user control may enable the user to adjust the mixed signal between two extremes: (1) having both left and right audio sent to the usable ear, and (2) normal output (i.e., full pan). This form of user control may be referred to as control of "contralateral routing of signal" (CROS).

Figure 13:
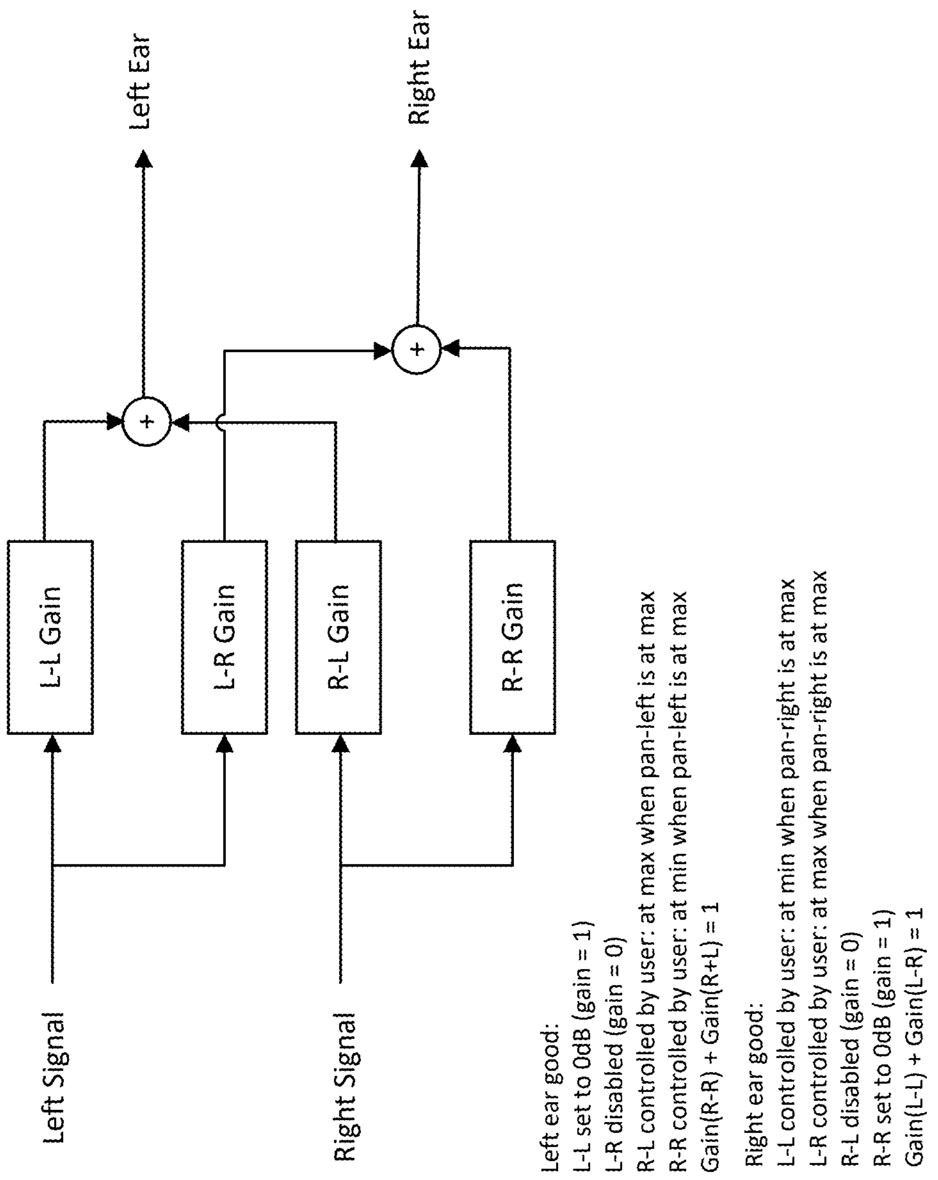
FIG. 13 shows another example DSP implementation.

FIG. 13 shows one example of how the CROS control may be implemented in a digital signal processor (DSP), such as the DSP(s) 406 and/or processor(s) 414 of FIG. 4, the DSP implementation 700 of FIG. 7, or the DSP implementation 1200 of FIG. 12. As shown, when the user controls the transition between full-pan and mono, the controller the user is using will cause two gains (R-L and R-R, or L-L and L-R) to change simultaneously in opposite directions, so that the sum of the two gains is always 1 (0 dB).

In more detail, with reference to FIG. 13, with this form of control, when the user's left ear is the good (usable) ear, and the right ear is the bad (unusable) ear, a panning control may be made available to the user, enabling the user to choose a range of panning between Pan Center and Pan Left. 100% of the audio originally intended for the left ear may be routed to the left output. The user may have no control over this routing. 0% of the audio originally intended for the left ear is routed to the right ear. Again, the user has no control over this routing. Between 0% (Full Pan Left) and 100% (Full Pan Center) of the audio originally intended for the right ear may be routed to the left output, and between 0% (Full Pan Center) and 100% (Full Pan Left) of the audio originally intended for the right ear may routed to the right output.

When the right ear is the good (usable) ear and the left ear is the bad (unusable) ear, a panning control may be made available, enabling the user to choose a range of panning between Pan Center and Pan Right. 100% of the audio originally intended for the right ear may be routed to the right output. The user may have no control over this routing. 0% of the audio originally intended for the right ear may be routed to the left ear. Again, the user has no control over this routing. Between 0% (Full Pan Right) and 100% (Full Pan Center) of the audio originally intended for the left ear may be routed to the right Output. Between 0% (Full Pan Center) and 100% (Full Pan Right) of the audio originally intended for the left ear may be routed to the left output.

Yet another form of user control that may be provided to assist users with symmetrical hearing loss, where users with such loss may benefit most from the overall EQ control discussed above, may be referred to herein as an EQ tilt control. Such EQ tilt control may be presented to the user, for example, in place of the differential EQ control illustrated in FIG. 8, so that the user may adjust the EQ tilt control in combination with the overall EQ control. The EQ tilt control may be provided to address non-linearities in a user's perceived loudness at different (e.g. lower or higher) frequencies to make the overall EQ correction provided by the overall EQ control more natural and comfortable. In particular, the EQ tilt control may enable the user to add emphasis to either the higher or lower correction frequency range provided by the overall EQ control by raising the gain at the emphasized frequencies more rapidly as the user increases the amount of overall EQ correction via the overall EQ control. As presented on the user interface (e.g., in place of the differential EQ control in FIG. 8), the EQ tilt control would start at a neutral position that allows the overall EQ control to operate normally, linearly applying the corrected gain across the full frequency range per the originally calculated gain profile of the overall EQ filter(s) (e.g., the gain profile illustrated in FIG. 9). But then using the EQ tilt control, for example, by rotating the rotary encoder 118 in a clockwise direction, the user may adjust to favor the higher frequencies, such that the gain provided in the higher frequency correction bands of the overall EQ correction would increase more rapidly as the amount of overall EQ control (indicated at 802 in FIG. 8) is being increased by user rotation of the rotary encoder 116. The more such high-frequency "tilt" added via clockwise rotation of the rotary encoder 118, the more rapidly the increase in gain in the high-frequency correction bands with each increase in the overall EQ correction (shown at 802 in FIG. 8) made via the rotary encoder 116. Conversely, if the EQ tilt control is tilted towards low frequencies (e.g., by counter-clockwise rotation of the rotary encoder 118), the gain provided in the lower frequency correction bands of the overall EQ correction would increase more rapidly as the amount of overall EQ control (indicated at 802 in FIG. 8) is being increased by user rotation of the rotary encoder 116. The more such low-frequency "tilt" added via counter-clockwise rotation of the rotary encoder 118, the more rapidly the increase in gain in the low-frequency correction bands with each increase in the overall EQ correction (shown at 802 in FIG. 8) made via the rotary encoder 116.

Thus, disclosed herein are methods, apparatus, and systems for providing hearing loss compensation in an audio device based on hearing information of a user, while enabling a user to control the degree to which one or more different forms of hearing loss compensation (i.e., correction)—including control of dynamics, overall EQ correction, differential EQ correction, secondary EQ correction, EQ tilt, CROS correction, and/or dead region ducking—are applied to an audio signal output via the audio device. The methods, apparatus, and systems described herein may be used to enhance the individual listening experience in professional, prosumer, and consumer listening environments and may be used when listening with headphones, in-ear-monitors (IEMs), or speakers.

In accordance with another aspect of the methods, apparatus, and systems for hearing loss compensation described herein, the hearing information (e.g., audiogram) of a user, which may be entered by the user as discussed above, downloaded into the audio device, or provided via a built-in hearing test (see below), may be matched with one of a plurality of "common" hearing profiles, such as the common hearing profiles discussed above. Because different ones of the user controls discussed above may be more or less useful in providing hearing loss compensation depending upon which of the common hearing profiles most closely matches the user's hearing information, the audio device may, based on matching the user's hearing information to one of the plurality of common hearing profiles, determine which of the user controls described above should be presented to the user. For example, certain controls may be determined not to be useful given a particular common hearing profile, and a user whose hearing information matches that common hearing profile may not be given access to those controls via the user interface controls of the audio device.

For example, if it is determined that a user may not benefit from use of the dynamics control discussed above and illustrated in FIG. 11, but that user would benefit from the overall EQ compensation and differential EQ compensation controls, then the user may be presented only with the user interface illustrated in FIG. 8, but not the user interface illustrated in FIG. 11.

As discussed above, the plurality of common hearing profiles may comprise one or more of the following:

Normal. As discussed above, the hearing information of a user may be matched to the “normal” profile if the information indicates little to no loss of hearing across all of the frequencies included in the hearing information. A user whose hearing information is matched to the “normal” common profile would likely not benefit from any of the forms of user control, except perhaps the dynamic controls. Accordingly, if a user’s hearing information is determined to match the “normal” profile, the audio device may present only the dynamic controls to the user.

Symmetrical. As discussed above, the hearing information of a user may be matched to the “symmetrical” hearing profile if the information indicates that the difference between any hearing loss in the left and right ears at each frequency included in the hearing information does not exceed a predetermined threshold. As one example, the threshold may be 10 dB. That is, if the difference between any hearing loss in the left and right ears at each frequency in the profile does not exceed 10 dB, the user’s hearing information would be matched with the symmetrical hearing profile. In other examples, the threshold may be different. For example, the threshold may comprise 15 dB. A user whose hearing information is matched with the symmetrical profile may not benefit from the differential EQ control discussed above, because any loss of hearing would be common in both ears. Thus, as an example, the audio device may not present the user with the differential EQ control discussed above. However, this user with symmetrical hearing loss may benefit from the EQ tilt control discussed above.

Asymmetrical. As discussed above, the hearing information of a user may be matched to the “asymmetrical” hearing profile if the information indicates that the difference between any hearing loss in the left and right ears at any frequency included in the hearing information exceeds a predetermined threshold. As one example, the threshold may be 10 dB. That is, if the difference between the hearing loss in the left and right ears at any frequency in the profile exceeds 10 dB, the user’s hearing information would be matched with the asymmetrical hearing profile. Unlike a user with a “symmetrical” hearing profile, a user whose hearing information is matched with the asymmetrical profile may benefit from the differential EQ control discussed above, and thus, the audio device may present the user with the differential EQ control.

Mid-range Dip. As discussed above, the hearing information of a user may be matched to the mid-range dip hearing profile if the information indicates significant loss (i.e., above a threshold such as 10 dB) in mid-range frequencies, but less loss at higher frequencies. A user whose hearing information is matched to the mid-range dip profile may benefit from both overall EQ correction and differential EQ correction, but the need for such correction may be in the mid-range frequencies for which the loss is above the threshold. The audio device might present the user with overall EQ correction and/or differential EQ correction focused on those mid-range frequencies for which the loss is above the threshold. The audio device might also present such a user with multi-band compression and/or limiting controls.

Cochlear Dead Region. The hearing information of a user may be matched to the “cochlear dead region” profile if the information indicates a hearing loss of 90 dB or greater at a particular frequency or range of frequencies. In such case, the user may benefit from the dead region ducking control described above, but perhaps not the differential EQ control. Thus, a user whose hearing information is matched to the potential cochlear dead region profile may be presented with overall EQ control and the dead region ducking control, but not the differential EQ control.

Profound Unilateral. The hearing information of a user may be matched to the unilateral profile if the information indicates that the user has usable hearing in only one ear. Such a user may benefit from the CROS control discussed above and the overall EQ control, but perhaps none of the other forms of control. Thus, a user whose hearing profile is matched with the unilateral profile may be presented only with the CROS and overall EQ controls.

Table 2 summarizes which controls the audio device may make available (i.e., present to) a user based on a determination of which common profile the user’s hearing information most closely matches:

TABLE 2

| | CONTROL | | | | | | |
|---|---|---|---|---|---|---|---|
| Hearing Profile | Dynamics | Overall EQ | Diff. EQ | Secondary EQ | Dead Region Ducking | EQ Tilt | CROS |
| Normal | X | | | | | | |
| Symmetrical | X | X | | | | X | |
| Asymmetrical | X | X | X | | | | |
| Mid-range Dip | X | X | | X | | | |
| Cochlear Dead Region | X | X | | | X | | |
| Profound Unilateral | X | X | | | | | X |

The determination of which common hearing profile the user’s hearing information most closely matches may be performed using any one of, or a combination of, a variety of different methods. For example, the user’s hearing information (e.g., dB loss at each frequency and dB difference between left and right ears at each frequency) may be compared to predetermined thresholds associated with each of the different common hearing profiles. Alternatively, or in addition, each common hearing profile may be represented as a pattern, and any suitable pattern matching algorithm may be employed to determine a match between the user’s hearing information and the known patterns of the different common hearing profiles. In yet other implementations, a machine learning model may be trained to classify a user’s hearing profile as most closely matching one of the plurality of common hearing profiles. The machine learning model may be trained using sample hearing information from different users. An audiologist may be employed to label the sample hearing information of the different users to create a labeled training dataset for the machine learning model. The machine learning model may be trained using the labeled training dataset. Once sufficiently trained, the hearing information of a user of the audio device (entered manually, downloaded, or determined by a self-administered built-in hearing test) may be input to the machine learning model, which based on its training, may then determine which of the common hearing profiles most closely matches the user’s hearing information (i.e., audiogram). The machine learning model may be implemented within the audio device. Alternatively, the machine learning model may be cloud-based, in which case a user’s hearing information may be sent by the audio device, via network such as the internet, to the cloud-based machine learning model for a determination of which common hearing profile most closely matches the user’s hearing information.

By determining which hearing loss compensation controls to make available to a user based on a determination of which of a plurality of common hearing profiles the user's hearing information most closely matches, the user may be presented with a more tailored hearing compensation experience.

Figure 14:
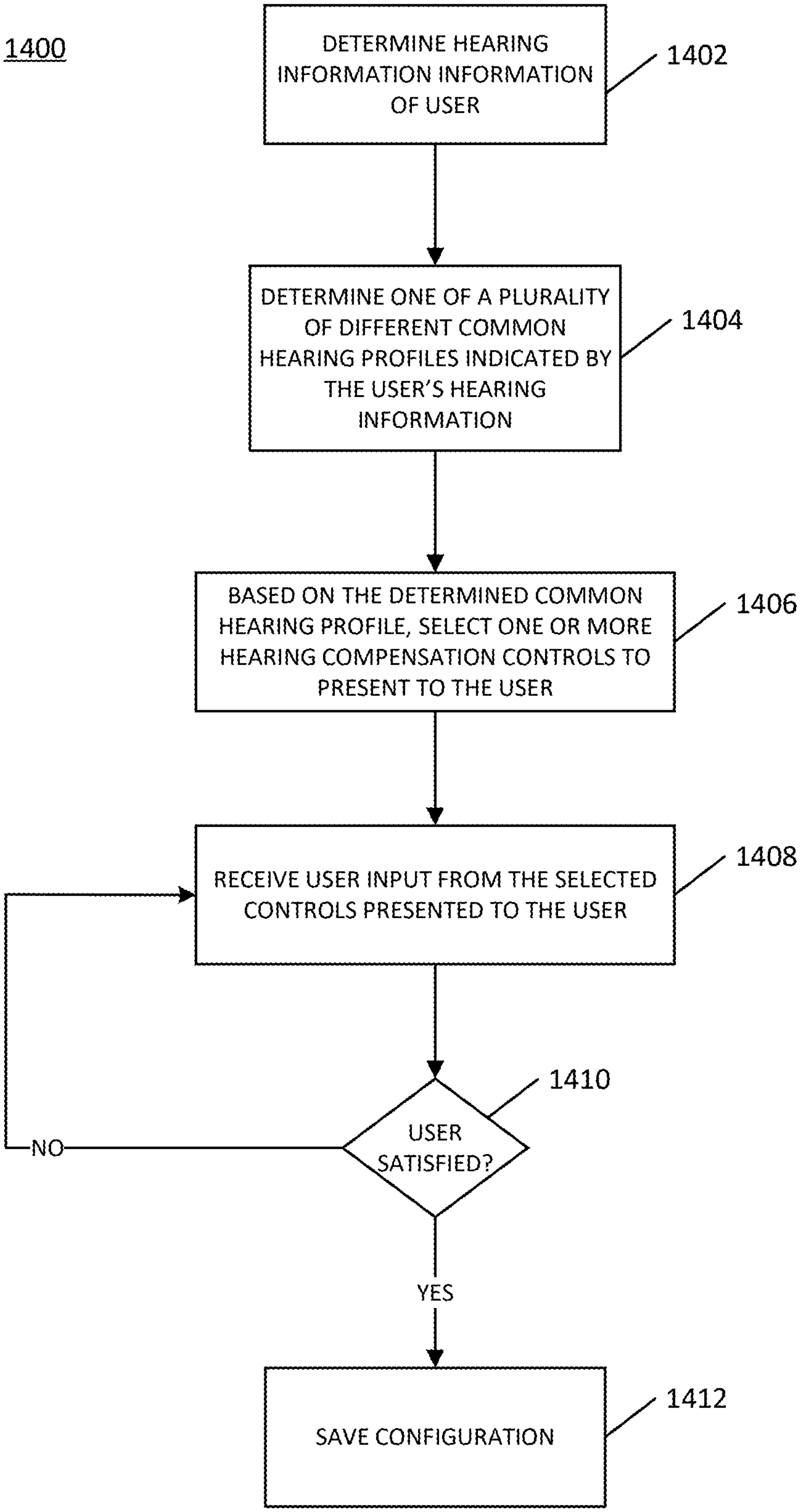
FIG. 14 shows an example method.

FIG. 14 shows a method 1400. The method 1400 may be performed using an audio device, such as the audio device 100 (e.g., personal mixer) shown in FIGS. 1-3, 4, 7, 8, 11, 12, and 13.

In step 1402, hearing information of a user of the audio device may be determined. As discussed above, the hearing information of the user may be determined by the user manually entering the information using the user interface controls of the audio device. Alternatively, or in addition, the user's hearing information may be determined by downloading the information into the audio device from an external source, such as a connected computer, laptop, tablet, USB memory device, or the like. Alternatively, or in addition, the user's hearing information may be determined by the user executing one or more built-in hearing self-test methods discussed, as discussed more fully below.

In step 1404, based on the hearing information of the user, the audio device 100 may determine one of a plurality of different common hearing profiles indicated by the user's hearing information. For example, the audio device 100 may determine which of the plurality of different common hearing profiles the user's hearing information most closely matches. The plurality of different common hearing profiles may comprise the different common hearing profiles discussed above and summarized in Table 2 (e.g., Normal, Symmetrical, Asymmetrical, Midrange Dip, Cochlear Dead Region, or Unilateral).

The determination of which of the common hearing profiles the user's hearing information most closely matches may be performed using any one of, or a combination of, a variety of different methods. For example, the user's hearing information (e.g., dB loss at each frequency and dB difference between left and right ears at each frequency) may be compared to predetermined thresholds associated with each of the different common hearing profiles. Alternatively, or in addition, each common hearing profile may be represented as a pattern, and any suitable pattern matching algorithm may be employed to determine a match between the user's hearing information and the known patterns of the different common hearing profiles. In yet other implementations, a machine learning model may be trained to classify a user's hearing profile as most closely matching one of the plurality of common hearing profiles. The machine learning model may be trained using sample hearing information from different users. An audiologist may be employed to label the sample hearing information of the different users to create a labeled training dataset for the machine learning model. The machine learning model may be trained using the labeled training dataset. Once sufficiently trained, the hearing information of a user of the audio device (entered manually, downloaded, or determined by a self-administered built-in hearing test) may be input to the machine learning model, which based on its training, may then determine which of the common hearing profiles most closely matches the user's hearing information (i.e., audiogram). The machine learning model may be implemented within the audio device. Alternatively, the machine learning model may be cloud-based, in which case a user's hearing information may be sent by the audio device, via network such as the internet, to the cloud-based machine learning model for a determination of which common hearing profile most closely matches the user's hearing information.

At step 1406, based on the determined common hearing profile that the user's hearing information most closely matches, the audio device 100 may determine (e.g., select) one or more hearing compensation (i.e., correction) controls to present (i.e., make available to) the user (i.e., allow the user to operate or use). The one or more hearing compensation controls may comprise any one or more of the controls discussed above, such as the overall EQ control, differential EQ control, secondary EQ control, EQ tilt control, dynamics control(s) (e.g., gating, compression, multiband compression, and/or limiting), dead region ducking control, or CROS control. The selection of which controls to present (make available to via the user interface elements of the audio device) the user may be based on the selections indicated in Table 2 above.

At step 1408, the audio device may receive input from the user based on the user's operation of the one or more hearing compensation controls presented to the user. For example, the user may provide user input using the user interface elements illustrated, for example, in FIGS. 8 and/or 11. The user input provided by these hearing compensation controls may cause the original right and left audio signals (e.g., signals 404*a* and 404*b* shown in FIGS. 7 and 11) to be processed in the various ways discussed above (e.g., filtered, gated, compressed, limited, or otherwise adjusted) to produce the right and/or left filtered audio signals (408*a*, 408*b*) that are output (i.e., transmitted, sent, etc.) to the user's audio output device (e.g., headphones, IEMs, speakers), which filtered audio signals 408*a*, 408*b* may help to compensate for the user's hearing loss indicated in the user's hearing information.

As indicated by step 1410, the audio device 100 may continue to receive user input as the user makes adjustments using the selected (presented) controls until the user achieves a filtered output signal 408*a*, 408*b* that the user perceives to be the most pleasing to the user. Once the user has achieved the desired filtered audio signal 408*a*, 408*b*, the settings achieved using the presented controls may be saved to the memory (e.g., memory 416) of the audio device 100, as shown at step 1410.

As can be appreciated, the degree to which a user applies the various presented controls may differ depending on the nature of the audio output device (i.e., listening device) the user is using, such as the particular brand or model of headphones, brand or model of in-ear monitors, or brand or model of speakers. By giving the user the ability to save the final settings achieved via the presented controls, the user is able to create a custom listening experience tailored to the particular audio output device the user happens to be using with the audio device 100. Thus, the hearing loss compensation provided by the methods, apparatus, and systems described herein, coupled with traditional equalization controls, presents a user with an incredibly accurate sonic signature that is optimized for a particular listening device, be it a specific headphone or a specific set of IEMs. A set of optimally set controls for a specific listening device, i.e. headphone model, IEM model, or monitor speaker model, may be stored and then later recalled as the user chooses to listen through these different devices.

The methods, apparatus, and systems for hearing loss compensation described and claimed herein provide a user with a set of intuitive, multi-parameter controls, that may be custom configured based on the user's hearing loss profile and use case. Each user may be presented with an optimized set of controls for their specific hearing loss profile. The presented set of controls may allow the user to adjust the DSP processing of the original audio signal to compensate of the user's hearing loss in an intuitive way that requires little or no understanding of the actual underlying DSP processing being performed. These controls can be adjusted by the user simply by listening to the resulting filtered audio signal once the user's hearing information (audiogram data) has been entered into or otherwise obtained by the audio device.

As mentioned above, according to another aspect of the methods, apparatus, and system described herein, an audio device, such as the audio device 100 illustrated in FIGS. 1-4, 7, 8, 11, 12, and 13, may provide a built-in hearing test capability that a user may employ to generate hearing information (i.e., an audiogram) for the user. Unless the listening device used by the user is calibrated, the built-in hearing test result will account for the user's hearing loss as well as the nonlinearities of the listening device(s) (i.e. headphones, IEMs, or speakers and the room acoustics). Thus, this method utilizing uncalibrated listening devices may not result in a traditional user audiogram, but it may still provide useful data on which a filter set and associated compressors/limiters and custom controls may be determined and presented to the user for effective hearing loss compensation. Alternately, the built-in test may take into consideration the headphone or IEM manufacturers' published sensitivity and frequency response data to better approximate a traditional audiogram test result.

In one implementation, the audio device may provide the user with a "Hearing Test" option, for example within a section of a setup menu. When the Hearing Test option is selected, the user may be provided with instructions to follow in order to complete a hearing self-test. During the test, the user may listen for various tones and indicate whether or not the user heard the tone. In one implementation, the audio device may provide multiple test method options, so that the user may choose a test that best suites the user's preferred test style, thereby providing more accurate results.

The tones for the hearing test may be generated by a DSP within the audio device, such as the DSP(s) 406 of FIG. 4 or the DSP implementations of FIG. 7 or 11. Such DSP may be capable of producing a tone at any frequency and volume level. It may be preferable for any hearing test tone to include a slight "warble" (instead of a straight sine wave). This may help a user with tinnitus to distinguish the test tones from their tinnitus perception.

The built-in hearing test should take into account the "dB HL" (hearing level) frequency curve, which is different from "dB SPL" (sound pressure level). ISO provides a document that explains further and lists the RETSPL (reference equivalent threshold sound pressure levels) for standard audiometric testing transducers. Since each transducer has different RETSPL, it is not possible to say there is a single dBHL conversion, only that the hearing test data is displayed in its correct corresponding dBHL. All hearing tests preferably will convert various dB SPL values into dB HL values.

When a user is conducting the built-in hearing self-test, it is important that any background ambient noise is kept to a minimum during the test, otherwise the results may be inaccurate (e.g., with too much background noise, the user may not be able to hear some tones at certain levels that they would normally hear if the background noise is not present). Instructions to a user may warn the user to only conduct the test in a quiet environment. Another potential option is to monitor the background noise via an onboard microphone (not shown) within the audio device. If the background noise reaches a specified threshold, the user can either be provided with a warning message, or the test can be paused. If it is paused for too long, it may be cancelled. Such monitoring may be done by the DSP(s) within the audio device.

In one implementation, the threshold for background ambient noise may be set in accordance with the threshold set forth in the OSHA Occupational Noise Exposure standard (noise standard), 29 CFR § 1910.95, Appendix D). When this threshold is crossed, the testing may be paused, and the user may be notified with an error message. The user may be allowed to continue the test when the background noise falls back under this threshold.

In another implementation, the threshold for background ambient noise may be set to the MPANL (maximum permissible ambient noise level) set forth in American National Standards Institute (ANSI) standard S3.1-1999 (R2018. When this threshold is crossed (but not the OSHA threshold above), a warning message or indicator may be presented to the user.

Figure 15A:
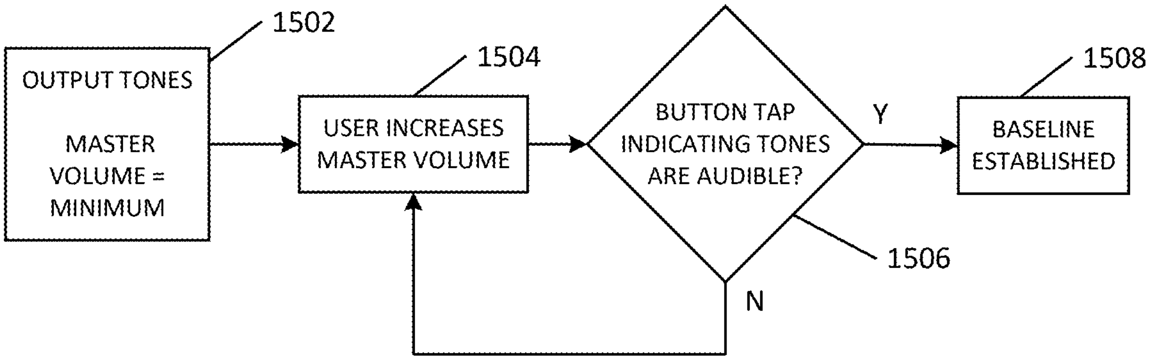
FIG. 15A shows an example built-in hearing self-test method.

With reference to FIG. 15A, as a first step in the built-in hearing test, a baseline level may be established for the user. This may be referred to as a biologic calibration. However, the listening gear used by the user (e.g., headphones, IEMs, speakers) may also affect the baseline calibration. In connection with this step of the built-in test, all audio normally input to the audio device (e.g., instrument and mic inputs) is cut off from the audio output to the listening device (headphones/IEM/speakers). At the outset of step 1502, he user may be instructed to turn the master volume knob (e.g., knob 108) to minimum.

In step 1502, the DSP(s) 406 may begin to output two tones to the user. The two tones may be different in frequency but close together. For example, 500 Hz and 1 kHz tones may be output. Preferably, they are not so close together that they sound dissonant. The two tones' volume levels may be different by approximately 40 dB. For example, the 500 Hz tone may be approximately 40 dB softer than the 1 kHz tone. The two tones may presented (i.e., output) in both ears identically. The two tones may be alternately played in a pleasing rhythmic pattern, not simultaneously.

In step 1504, the user may be instructed to increase the master volume knob 108 until both tones can be heard, then tap any other button on the audio device. When it is determined in step 1506 that a key was tapped, the master volume setting may be recorded (i.e., stored) as shown at step 1508. For the remainder of the built-in hearing test, the master volume knob may be disabled. That is, the master volume level is now fixed, with all dB level changes being controlled via the DSP(s). Any future user adjustments may be handled via the encoders 116, 118. The master volume setting (baseline) saved in step 1508 may be converted into a dB level that is used as the established baseline for the start of the remainder of the hearing test. The 0 dB level for the hearing information (e.g., audiogram) may be calculated based on the dB level of the tone output by the DSP, the stored master volume setting, and the gain inherent in the digitally controlled analog audio output circuitry (not shown) of the audio device.

Figure 15B:
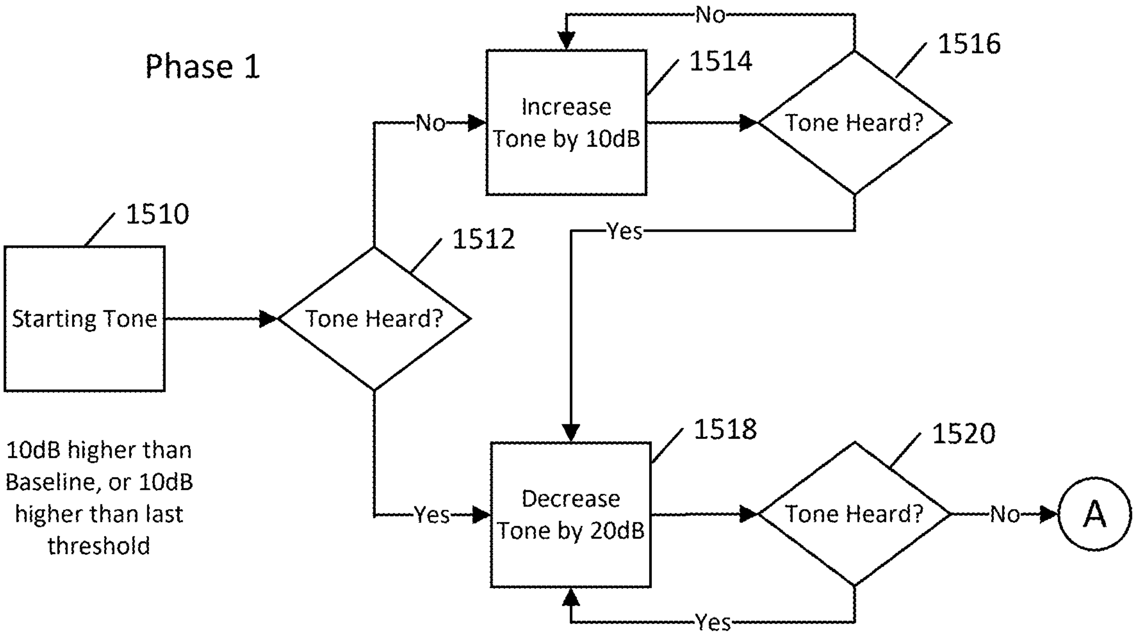
FIGS. 15B and 15C show another example built-in hearing self-test method.
Figure 15C:
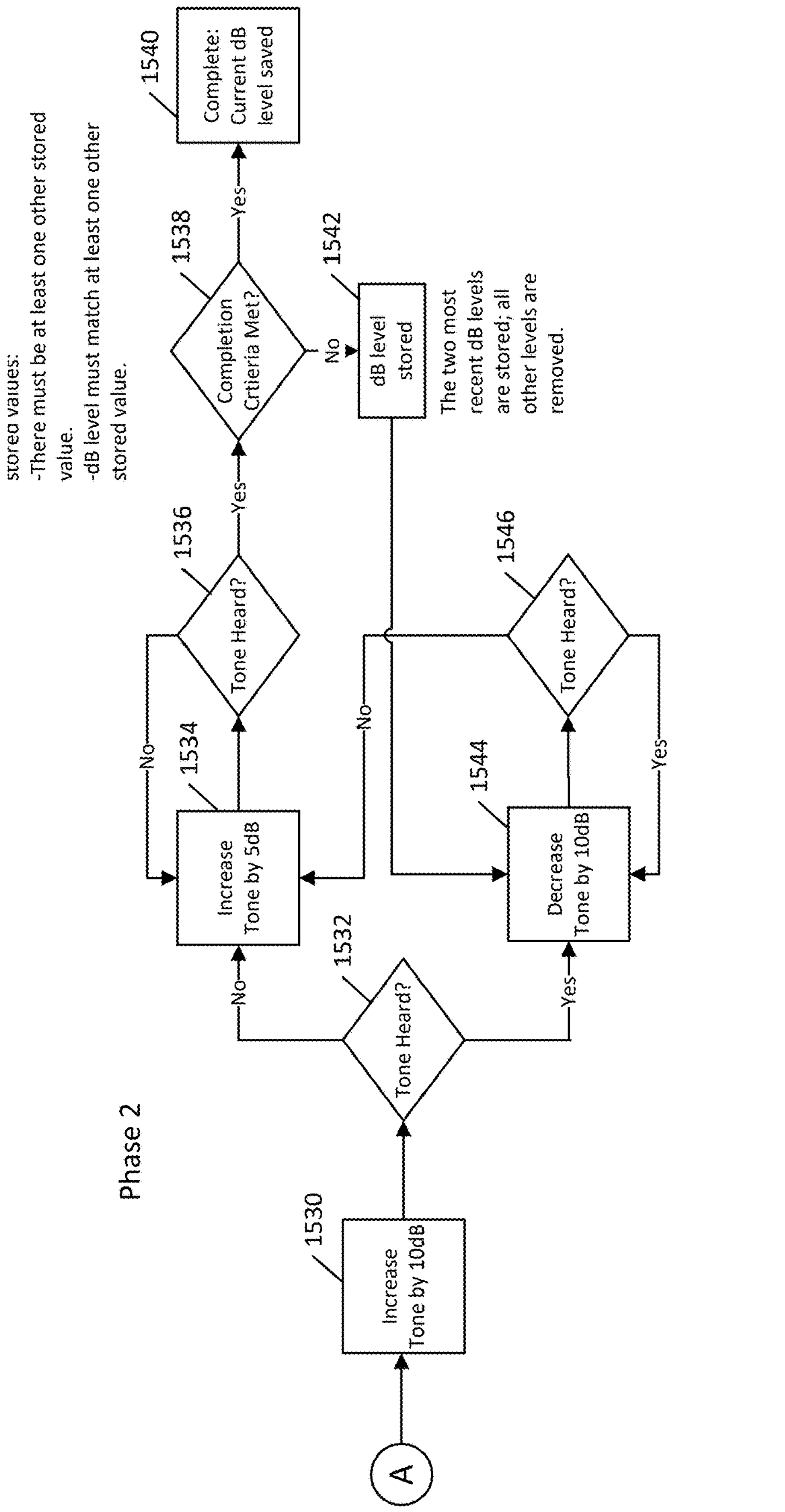

FIGS. 15B and 15C together show a first method for a user to perform a hearing self-test on a single ear to obtain hearing information for that ear of the user. The method may be performed on each ear separately. This test is similar to the Hughson-Westlake tests that are typically administered by audio professionals, in which a short tone is output to the user, and the user indicates whether or not the tone was heard. This is repeated at various frequencies and volume levels until the complete hearing information is determined (i.e., tones are presented at each of the frequencies addressed in the hearing profile (i.e., audiogram).

Similar to such Hughson-Westlake tests, in the case of the method shown in FIGS. 15B and 15C, the user may be instructed to tap one of the user interface buttons or controls whenever the user hears a tone during the test. The user may be instructed to do nothing (i.e., not press any buttons) if the user does not hear a tone. The display screen of the audio device (e.g., display 110 of FIGS. 1 and 2) may display a graphic to acknowledge to the user whenever a button tap is detected.

For each frequency to be included in the hearing information (e.g., 125 Hz, 250 Hz, 500 Hz, 750 Hz, 1 kHz, 1.5 kHz, 2 kHz, 3 kHz, 4 kHz, 6 kHz, 8 kHz, 10 kHz, 11.2 kHz, 12.5 kHz, 14 kHz, and/or 16 kHz), at step 1510, the audio device may start by outputting a tone at an initial dB level and then incrementally increasing the dB level until the user indicates by a button press that the tone has been heard (see, steps 1512, 1514, and 1516). For example, the audio device may increment the dB level by 10 dB each time. The first tone may be output slightly louder (e.g., 10 dB louder) than the determined baseline for the user (as determined above in accordance with the method illustrated in FIG. 15A).

In a first phase of the test (FIG. 15B), once the tone at a given frequency reaches an output dB level that is heard by the user (i.e., the user taps a button as determined at step 1516), the audio device may then begin to incrementally decrease the output level by a predetermined amount (e.g., (20 dB) until tone is no longer heard (the user does not press a button) (steps 1518, 1520).

In a second phase of the test (FIG. 15C), a shown at step 1530, the audio device increments the output level again by 10 dB. If, at step 1532, the tone is heard, the level is decreased by 10 dB at step 1544. If the tone is not heard (step 1532 or step 1546), then at step 1534, the level is increased by 5 dB. This may be referred to as a "down 10, up 5" method similar to a modified Hughson-Westlake bracketing procedure. Phase 2 continues until the audio device receives two responses (i.e., button presses) at a single lowest dB level out of three trials, or the response otherwise meets a statistical acceptance criteria at that dB level (step 1538). The dB level is then recorded (step 1540), and the test progresses to the next frequency in the profile.

In terms of the order of frequencies addressed during the test, the audio device may start with 1 kHz and increase in the order discussed above to 8 kHz (or 16 kHz). The audio device may then re-test at 1 kHz and verify the result is within 5 dB of the original 1 kHz test. If not, then the audio device may loop back to the first step and repeat (1 kHz to 8 kHz (or 16 kHz). Once the 1 kHz result is within 5 dB of the previous 1 kHz test, the audio device may then change the frequency to 750 Hz and decrease from there to 250 Hz (or 125 Hz) inclusive.

The tones output to the user at the various frequencies during the self-test may comprise frequency-modulated signals. The tones may be compliant with the standards set forth in ANSI s3.6 for audiometers. For example, the waveform of the modulating signal may be either sinusoidal or triangular with symmetrical increasing and decreasing portions on a linear or logarithmic frequency scale. The carrier frequency may be within 3% of the nominal frequency. The repetition rate of the modulating signal may be within the range from 4 to 20 Hz with a tolerance of 10% of its value. The total frequency deviation around the carrier frequency may be in the range from 5% to 25% with a tolerance of 10% of its stated value.

Figure 16:
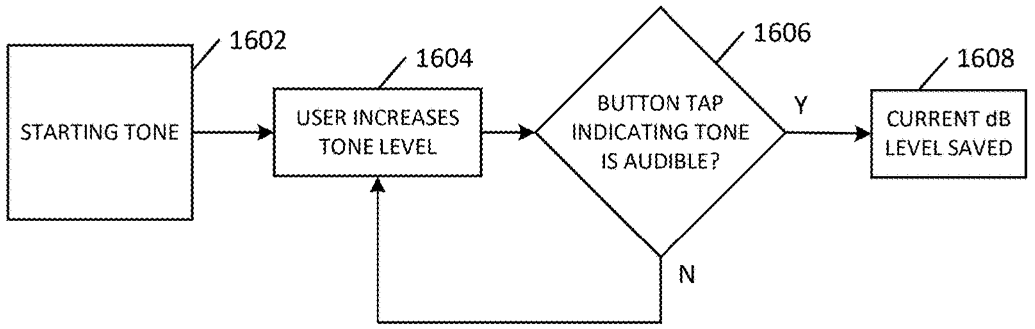
FIG. 16 shows another example built-in hearing self-test method.

Alternatively, or in addition, the hearing self-test built into the audio device may implement a Békésy Test. FIG. 16 shows an example of the Békésy Test sequence for a single trial at a single frequency. In this form of test, instead of holding down and releasing a button, an initial tone is output (step 1602) and the user may use one or more of the rotary encoders (e.g., rotary encoders 116 and/or 118) to actually adjust the volume of the tone at a given frequency to the point of being audible (steps 1604). After the user has determined the point at which a tone is barely audible, the user may tap a button at step 1606 to indicate that that point has been determined. The current dB level may then be saved at step 1608.

In one example implementation, a trial for each frequency may be performed at least twice. If the dB values determined from each trial match, then no further trials may be necessary. If the dB values determined from each trial do not match, then either (1) additional trials may be performed until two out of three results are matching, or (2) if the dB levels determined from the at least two trial are within 5 dB of each other, the average may be used as the dB value at that frequency.

One potential advantage of the Békésy Test method is that it is more interactive for the user, and the user may be more engaged with the self-test, resulting in less errors. It may also be quicker to administer.

Figure 17:
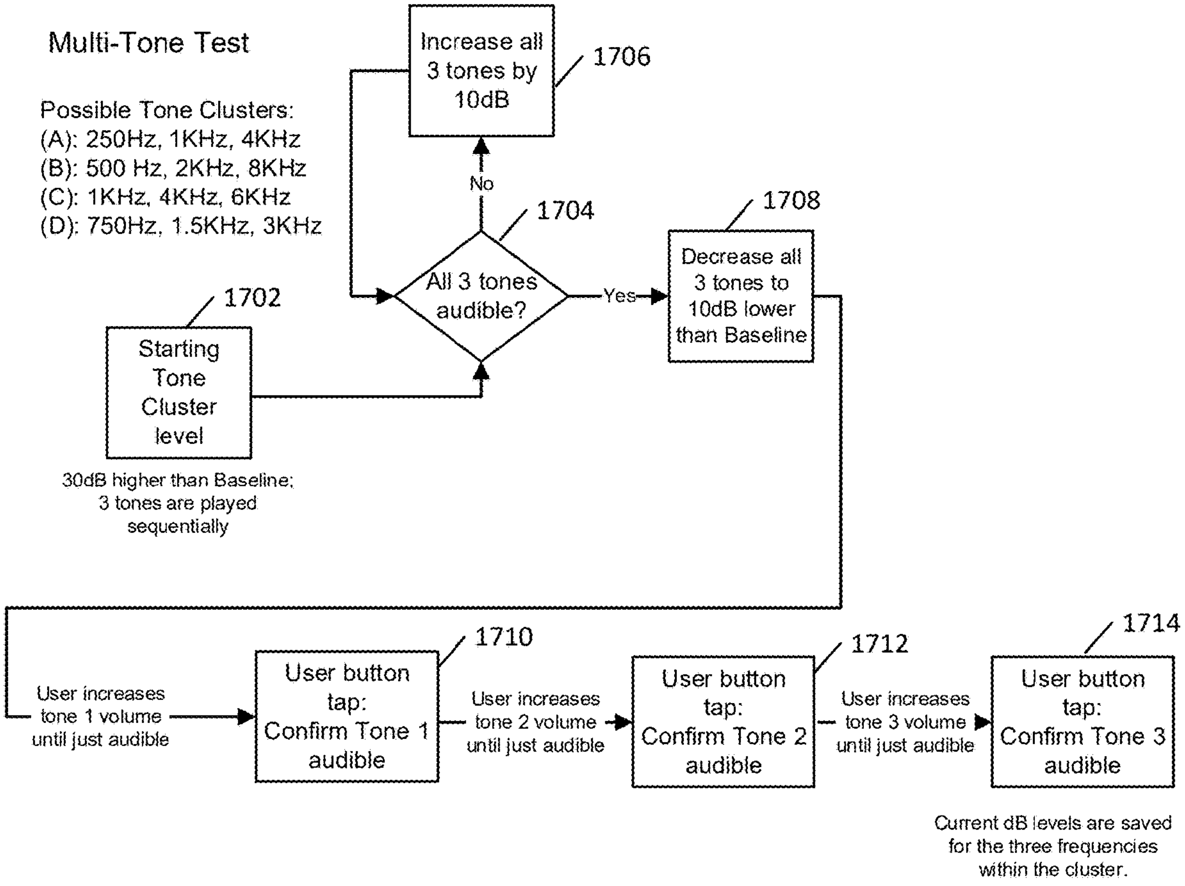
FIG. 17 shows yet another example built-in hearing self-test method.

FIG. 17 shows yet another example form of built-in hearing test that the audio device may enable a user to perform. This test may be referred to herein as a "multi-tone" test. This test may be more suited for musicians. This test may be implemented in addition to, or alternatively to, the methods shown in FIGS. 15A-C and 16.

In this multi-tone test, a "tone cluster" may be defined as a series of three tones (each of different frequency) that are played in a sequence or a pleasing rhythmic pattern (not simultaneously). For example, a tone cluster may consist of frequencies 250 Hz/1 kHz/4 kHz. According to the multi-tone test method, as shown in FIG. 17, at step 1702, a tone cluster may be output to the user at 30 dB above the predicted starting threshold (i.e., baseline) established in the biologic calibration (e.g., FIG. 15A). At step 1704, the user should confirm that all three tones can be heard. If all three tones cannot be heard, then at step 1706, the tone cluster output level may be increased by 10 dB until all three tones can be heard. Then, at step 1708, all tones may then be made "quiet" (e.g., the output volume may be reduced 10 dB below the predicted starting threshold established in the biologic calibration). The user may then increase the volume (using, for example, one of the rotary encoders 116, 118) until the 1$^{st}$ tone is just barely heard. At that point, the user should tap a button on the audio device to indicate that the 1$^{st}$ tone has been heard (step 1710). Note that in this step, the encoder only affects the volume of the 1$^{st}$ tone, not the other tones.)

Next, the user may then increase the volume (again using an encoder 116, 118) until the 2$^{nd}$ tone is just barely heard. Once the 2$^{nd}$ tone is heard, the user should tap a button to so indicate (step 1712). In this step, the encoder only affects the volume of the 2$^{nd}$ tone, not the other tones.

Next, the user then increases the volume (again using an encoder 116, 118) until the 3$^{rd}$ tone is just barely heard. Once the 3$^{rd}$ tone is heard, the user should again tap a button to so indicate (step 1714). Similar to the previous steps, in this step, the encoder only affects the volume of the $3^{rd}$ tone, not the other tones.

This process may then be repeated for other tone clusters until the dB levels at which the user has heard tones of all of the hearing information frequencies have been determined. A full testing of one ear may be performed first, and then the other ear may be tested once the test of the first ear is complete.

Note that in each of the methods described above and illustrated in FIGS. 15A, 15B, 15C, 16, and 17, if a dB level reaches a maximum threshold (e.g., 90 dB), and the user still cannot hear the presented tone, the level may no longer increase, and the dB level of hearing loss at that frequency will be specified to be 5 or 10 dB louder than the maximum threshold signal. A minimum threshold may also be established.

When any or all of the built-in self-test methods described above (and shown in FIGS. 15A-C, 16, and 17) have been performed by a user using the audio device, the resulting hearing information (i.e., audiogram data) may be saved to memory (e.g., memory devices 416). The user may be informed when a test is complete and may have the option to enter an "audiogram data" or "hearing information" screen, for example via the display 110, to view the resulting data. The data may be presented in the form of table, such as the example Table 1 above. Alternatively, or in addition, the data may be presented in the form of a graph, such as the example audiograms (hearing information) shown in FIGS. 5A, 5B, 5C, 5D, and 5E. The user may be provided with the ability to rename the hearing information, save it to an external device, such as a USB device connected via the USB interface 308, or save it internally as part of a user "configuration" within the audio device.

Any one or all of these built-in self-test methods may be implemented in software (i.e., computer-executable instructions) executed by the processor(s) 414 and/or DSP(s) 406 of the audio device in combination with user input provided via the user interface controls/display 412 of the audio device (e.g., display 110, rotary encoders 116, 118, and one or more buttons 104, 112, 114, 120 or 122).

As mentioned above, the degree to which a user applies the various compensation controls described above may differ depending on the nature of the audio output device (i.e., listening device) the user is using, such as the particular brand or model of headphones, brand or model of in-ear monitors, or brand or model of speakers. By giving the user the ability to test the user's hearing via a built-in self test using the same audio output device that the user typically uses to listen to the audio output by the audio device and to then save the final settings achieved via the presented controls, the user is able to create a custom listening experience tailored to the particular audio output device the user happens to be using with the audio device 100. Thus, the hearing loss compensation provided by the methods, apparatus, and systems described herein, coupled with traditional equalization controls, presents a user with an incredibly accurate sonic signature that is optimized for a particular listening device, be it a specific headphone or a specific set of IEMs. A set of optimally set controls for a specific listening device, i.e. headphone model or an IEM model, may be stored and then later recalled as the user chooses to listen through these different devices.

The methods, apparatus, and systems for hearing loss compensation described and claimed herein provide a user with a set of intuitive, multi-parameter controls, that may be custom configured based on the user's hearing loss profile and use case. Each user may be presented with an optimized set of controls for their specific hearing loss profile. The presented set of controls may allow the user to adjust the DSP processing of the original audio signal to compensate of the user's hearing loss in an intuitive way that requires little or no understanding of the actual underlying DSP processing being performed. These controls can be adjusted by the user simply by listening to the resulting filtered audio signal once the user's hearing information (audiogram data) has been entered into or otherwise obtained by the audio device.

As mentioned above, the methods, apparatus, and systems described herein are not limited to use in an audio device that comprises a personal mixing device, but rather may be employed in a wide variety of different types of audio devices, such as, for example, headphone amplifiers, in-ear monitor (IEM) amplifiers, wireless IEM devices, headphones, earphones, mixing consoles, audio DSP plugins running natively on audio systems, or as universal plugins, for example VST, AU, AAX, etc. type plugins, running on audio systems and/or on generic computer hardware, telephones, mobile phones, or other personal listening devices.

It is to be understood that the methods, apparatus and systems described herein are not limited to specific methods, specific components, or to particular implementations. It is also to be understood that the terminology used herein is for the purpose of describing particular concepts only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, an implementation may include from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey data indicating a preferred or ideal embodiment. "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The methods, apparatus and systems described herein may take the form of an entirely hardware implementation, an entirely software implementation, or an implementation combining software and hardware aspects. Furthermore, the methods, apparatus, and systems may take the form of a computer program product on a computer-readable storage medium having or storing computer-readable instructions (e.g., computer software or program code) embodied in the storage medium.

The various features, steps, concepts and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems, apparatus and components described herein may be configured differently than described. For example, elements may be added to, removed from, or rearranged compared to the described example embodiments.

Furthermore, some or all of the components, apparatus, systems and/or modules described herein may be implemented or provided in a variety of ways, such as at least partially in software, firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc.

While the methods and systems have been described in connection with specific examples, it is not intended that the scope be limited to the particular examples set forth, as the examples described herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. An audio device comprising:
a user interface;
one or more processors; and
memory storing instructions that, when executed by the one or more processors, cause the device to:
determine hearing information of a user, wherein the hearing information indicates, for each of the left and right ears of the user, an amount of hearing loss exhibited by the user at each of a plurality of frequencies;
determine, based on the hearing information of the user, a match between the hearing information of the user and one of a plurality of common hearing profiles;
based on the common hearing profile determined to match the hearing information of the user, select one or more hearing compensation controls to be made available to the user via the user interface of the audio device, wherein each of the one or more hearing compensation controls is operable to modify an original audio signal;
apply, based on user input from the selected one or more hearing compensation controls made available to the user via the user interface, one or more modifications to the original audio signal to generate a filtered audio signal; and
output the filtered audio signal to the user.

2. The audio device of claim 1, wherein the hearing information of the user comprises an audiogram, and wherein the audio device of claim 1, wherein the original audio signal comprises one of a stereo audio signal or a binaural audio signal.

3. The audio device of claim 1, wherein the plurality of common hearing profiles comprises two or more of:
a normal hearing profile;
a symmetrical hearing loss profile;
an asymmetrical hearing loss profile;
a mid-range dip profile;
a cochlear dead region profile; or
a profound unilateral hearing loss profile.

4. The audio device of claim 1, wherein the one or more hearing compensation controls comprises one or more of:
an overall equalization (EQ) control;
a differential EQ control;
a secondary EQ control;
an EQ tilt control
a compression control;
a multi-band compression control;
a limiting control;
a gating control;
a dead region ducking control; or
a contralateral routing of signal (CROS) control.

5. The audio device of claim 1, wherein the user input from at least one of the selected controls is received from the user while the filtered audio signal is being output to the user.

6. The audio device of claim 1, wherein determining, by the audio device, the hearing information of the user comprises at least one of:
receiving the hearing information via manual entry by the user;
downloading the hearing information into the audio device from another device; or
obtaining the hearing information via a hearing self-test built-into the audio device and performed by the user using the audio device.

7. The audio device of claim 1, wherein selecting, by the audio device, one or more hearing compensation controls to be made available to the user via the user interface of the audio device comprises enabling the user to control the selected one or more hearing compensation controls via the user interface.

8. The audio device of claim 1, wherein the audio device comprises at least one of: a personal monitor mixer, a headphone amplifier, an in-ear monitor (IEM) amplifier, a wireless IEM device, a mixing console, an audio DSP plugin, an audio plugin, a telephone, a mobile phone, or a personal listening device.

9. The audio device of claim 1, wherein the selected one or more hearing compensation controls made available to the user via the user interface comprises at least an overall equalization (EQ) control and a differential EQ control, and wherein the instructions that, when executed by the one or more processors, cause the audio device to apply, based on user input from the overall EQ control and the differential EQ control made available to the user, one or more modifications to the original audio signal to generate the filtered audio signal, cause the audio device to:

generate, based on the hearing information, at least a first filter configured to compensate for an overall hearing loss, common to both the left and right ears of the user, as indicated by the hearing information;

generate, based on the hearing information, at least a second filter configured to compensate for a difference in hearing loss, between the left and right ears of the user, as indicated by the hearing information;

apply the at least the first filter and the at least the second filter to the original audio signal to generate the filtered audio signal;

receive, while the filtered audio signal is being output to the user, user input indicative of a change in a strength of at least one of the at least the first filter or the at least the second filter to be applied to the original audio signal to generate the filtered audio signal; and adjust, based on the user input, the filtered audio signal output to the user.

10. The audio device of claim 9, wherein the at least the first filter comprises a multi-band stereo parametric equalization (EQ) filter, wherein each band of the multi-band stereo parametric EQ filter is associated with a different one of the plurality frequencies for which an amount of hearing loss is indicated by the hearing information, and wherein the at least the second filter comprises a multi-band mono parametric EQ filter, and wherein each band of the multi-band mono parametric EQ filter is associated with a different one of the plurality frequencies for which an amount of hearing loss is indicated by the hearing information.

11. A method comprising:

determining, by an audio device, hearing information of a user, wherein the hearing information indicates, for each of the left and right ears of the user, an amount of hearing loss exhibited by the user at each of a plurality of frequencies;

determining, based on the hearing information of the user, a match between the hearing information of the user and one of a plurality of common hearing profiles;

based on the common hearing profile determined to match the hearing information of the user, selecting one or more hearing compensation controls to be made available to the user via a user interface of the audio device, wherein each of the one or more hearing compensation controls is operable to modify an original audio signal;

applying, by the audio device and based on user input from the selected one or more hearing compensation controls made available to the user, one or more modifications to an original audio signal to generate a filtered audio signal; and outputting the filtered audio signal to the user.

12. The method of claim 11, wherein the plurality of common hearing profiles comprises two or more of:

a normal hearing profile;

a symmetrical hearing loss profile;

an asymmetrical hearing loss profile;

a mid-range dip profile;

a cochlear dead region profile; or a profound unilateral hearing loss profile.

13. The method of claim 11, wherein the one or more hearing compensation controls comprises one or more of:

an overall equalization (EQ) control;

a differential EQ control;

a secondary EQ control;

an EQ tilt control a compression control;

a multi-band compression control;

a limiting control;

a gating control;

a dead region ducking control; or a contralateral routing of signal (CROS) control.

14. The method of claim 11, wherein the user input from at least one of the controls is received from the user while the filtered audio signal is being output to the user.

15. The method of claim 11, wherein the selected one or more hearing compensation controls made available to the user via the user interface comprises at least an overall equalization (EQ) control and a differential EQ control, and wherein applying, based on user input from the overall EQ control and the differential EQ control made available to the user, one or more modifications to the original audio signal to generate the filtered audio signal, comprises:

generating, based on the hearing information, at least a first filter configured to compensate for an overall hearing loss, common to both the left and right ears of the user, as indicated by the hearing information;

generating, based on the hearing information, at least a second filter configured to compensate for a difference in hearing loss, between the left and right ears of the user, as indicated by the hearing information;

applying the at least the first filter and the at least the second filter to the original audio signal to generate the filtered audio signal;

receiving, while the filtered audio signal is being output to the user, user input indicative of a change in a strength of at least one of the at least the first filter or the at least the second filter to be applied to the original audio signal to generate the filtered audio signal; and adjusting, based on the user input, the filtered audio signal output to the user.

16. A non-transitory computer-readable medium storing computer-executable instructions that, when executed, cause:

determining, by an audio device, hearing information of a user, wherein the hearing information indicates, for each of the left and right ears of the user, an amount of hearing loss exhibited by the user at each of a plurality of frequencies;

determining, based on the hearing information of the user, a match between the hearing information of the user and one of a plurality of common hearing profiles;

based on the common hearing profile determined to match the hearing information of the user, selecting one or more hearing compensation controls to be made available to the user via a user interface of the audio device, wherein each of the one or more hearing compensation controls is operable to modify an original audio signal;

applying, by the audio device and based on user input from the selected one or more hearing compensation controls made available to the user, one or more modifications to an original audio signal to generate a filtered audio signal; and outputting the filtered audio signal to the user.

17. The non-transitory computer-readable medium of claim 16, wherein the plurality of common hearing profiles comprises two or more of:

a normal hearing profile;

a symmetrical hearing loss profile;

an asymmetrical hearing loss profile;

a mid-range dip profile;

a cochlear dead region profile; or a profound unilateral hearing loss profile.

18. The non-transitory computer-readable medium of claim 16, wherein the one or more hearing compensation controls comprises one or more of:

an overall equalization (EQ) control;

a differential EQ control;

a secondary EQ control;

an EQ tilt control a compression control;

a multi-band compression control;

a limiting control;

a gating control;

a dead region ducking control; or a contralateral routing of signal (CROS) control.

19. The non-transitory computer-readable medium of claim 16, wherein the user input from at least one of the controls is received from the user while the filtered audio signal is being output to the user.

20. The non-transitory computer-readable medium of claim 19, wherein the selected one or more hearing compensation controls made available to the user via the user interface comprises at least an overall equalization (EQ) control and a differential EQ control, and wherein the instructions that, when executed, cause applying, based on user input from the overall EQ control and the differential EQ control made available to the user, one or more modifications to the original audio signal to generate the filtered audio signal, cause:

generating, based on the hearing information, at least a first filter configured to compensate for an overall hearing loss, common to both the left and right ears of the user, as indicated by the hearing information;

generating, based on the hearing information, at least a second filter configured to compensate for a difference in hearing loss, between the left and right ears of the user, as indicated by the hearing information;

applying the at least the first filter and the at least the second filter to the original audio signal to generate the filtered audio signal;

receiving, while the filtered audio signal is being output to the user, user input indicative of a change in a strength of at least one of the at least the first filter or the at least the second filter to be applied to the original audio signal to generate the filtered audio signal; and adjusting, based on the user input, the filtered audio signal output to the user.

* * * * *